United States Patent
Ohmuro et al.

(10) Patent No.: US 7,710,982 B2
(45) Date of Patent: May 4, 2010

(54) SOUND PACKET REPRODUCING METHOD, SOUND PACKET REPRODUCING APPARATUS, SOUND PACKET REPRODUCING PROGRAM, AND RECORDING MEDIUM

(75) Inventors: Hitoshi Ohmuro, Kodaira (JP); Takeshi Mori, Higashiyamato (JP); Yusuke Hiwasaki, Kodaira (JP); Akitoshi Kataoka, Nerima-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 873 days.

(21) Appl. No.: 10/591,183

(22) PCT Filed: May 25, 2005

(86) PCT No.: PCT/JP2005/009569

§ 371 (c)(1),
(2), (4) Date: Aug. 30, 2006

(87) PCT Pub. No.: WO2005/117366

PCT Pub. Date: Dec. 8, 2005

(65) Prior Publication Data

US 2007/0177620 A1    Aug. 2, 2007

(30) Foreign Application Priority Data

May 26, 2004  (JP)  ............................ 2004-156069

(51) Int. Cl.
*H04L 12/28* (2006.01)

(52) U.S. Cl. .................. 370/395.64; 370/516; 370/519; 704/214

(58) Field of Classification Search .................. None
See application file for complete search history.

(56) References Cited

U.S. PATENT DOCUMENTS 5,623,483 A * 4/1997 Agrawal et al. ............. 370/253
5,694,521 A   12/1997 Shlomot et al.
5,809,454 A * 9/1998 Okada et al. ................ 704/214

(Continued)

FOREIGN PATENT DOCUMENTS

CN   1302513 A   7/2001

(Continued)

OTHER PUBLICATIONS

Morita et al., "Time-Scale Modification Algorithm for Speech by Use of Pointer Interval Control Overlap and Add (PICOLA) and Its Evaluation", Discourse Collected Papers of Acoustical Society of Japan, 1-4-14, pp. 149-150, 1986 (with full English translation).

(Continued)

*Primary Examiner*—Chirag G Shah
*Assistant Examiner*—Salvador E Rivas
(74) *Attorney, Agent, or Firm*—Oblon, Spivak, McClelland, Maier & Neustadt, L.L.P.

(57) ABSTRACT

The present invention prevents a receiving buffer from becoming empty by: storing received packets in the receiving buffer; detecting the largest arrival delay jitter of the packets and the buffer level of the receiving buffer by a state detecting part; obtaining an optimum buffer level for the largest delay jitter using a predetermined table by a control part; determining, based on the detected buffer level and the optimum buffer level, the level of urgency about the need to adjust the buffer level; expanding or reducing the waveform of a decoded audio data stream of the current frame decoded from a packet read out of the receiving buffer by a consumption adjusting part to adjust the consumption of reproduction frames on the basis of the urgency level, the detected buffer level, and the optimum buffer level.

12 Claims, 19 Drawing Sheets

U.S. PATENT DOCUMENTS

| | | | |
|---|---|---|---|
| 6,072,809 A * | 6/2000 | Agrawal et al. | 370/503 |
| 6,377,931 B1 | 4/2002 | Shlomot | |
| 2003/0179757 A1 | 9/2003 | Ten Kate et al. | |
| 2005/0058145 A1 * | 3/2005 | Florencio et al. | 370/412 |

FOREIGN PATENT DOCUMENTS

| | | |
|---|---|---|
| EP | 1 515 310 A1 | 3/2005 |
| JP | 1 93795 | 4/1989 |
| JP | 2002 164921 | 6/2002 |
| JP | 2003 50598 | 2/2003 |

OTHER PUBLICATIONS

Sakatani et al., "Real-Time Audio Communication Scheme Over Connectionless Networks", Technical Report on IEICE, IN96-3, CS96-3, MVE96-3, pp. 11-15, 1996 (with full English translation).

Yi J. Liang, et al., Adaptive Playout Scheduling Time-Scale Modification in Packet Voice Communications, 2001 IEEE International Conference on Acoustics, Speech and Signal Processing, XP 010803129, vol. 1, May 5, 2001, pp. 1445-1448.

* cited by examiner

TABLE 16T

| LARGEST JITTER J | OPTIMUM NUMBER OF PACKETS B TO BE BUFFERED |
|---|---|
| TO 15ms | 1 |
| TO 32ms | 2 |
| TO 48ms | 3 |
| TO 64ms | 4 |
| TO 80ms | 5 |
| TO 96ms | 6 |
| TO 128ms | 8 |
| TO 160ms | 10 |
| TO 192ms | 12 |
| TO 240ms | 15 |
| TO 320ms | 20 |
| TO 400ms | 25 |
| TO 480ms | 30 |
| TO 640ms | 40 |
| TO 800ms | 50 |

FIG. 4

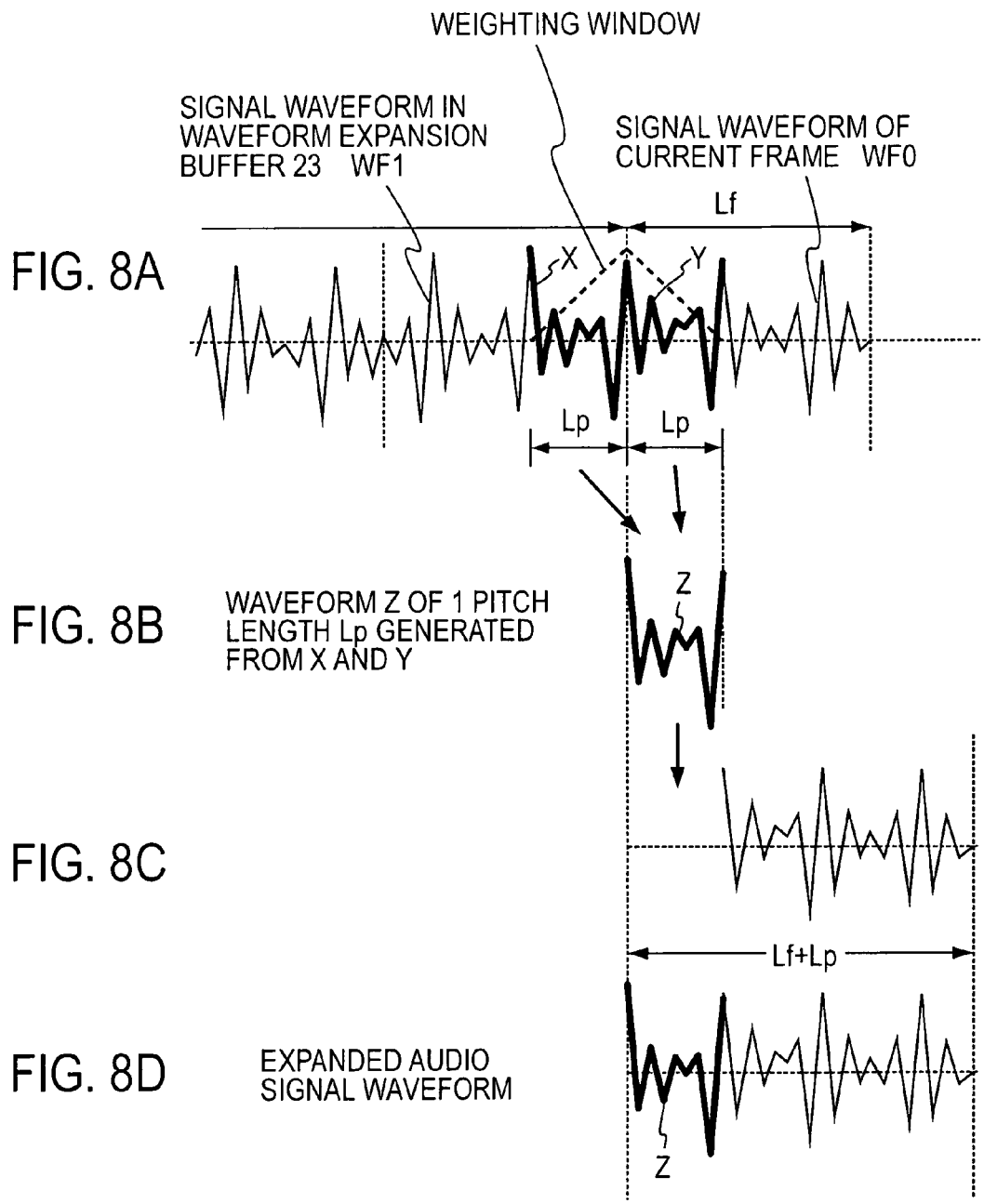

FIG. 9B  WAVEFORM Z' OF PITCH LENGTH Lp GENERATED FROM X' AND Y'

FIG. 9D  EXPANDED AUDIO SIGNAL WAVEFORM

FIG. 12B WAVEFORM F OF 1 PITCH LENGTH Lp GENERATED FROM D AND E

FIG. 12D REDUCE AUDIO SIGNAL WAVEFORM

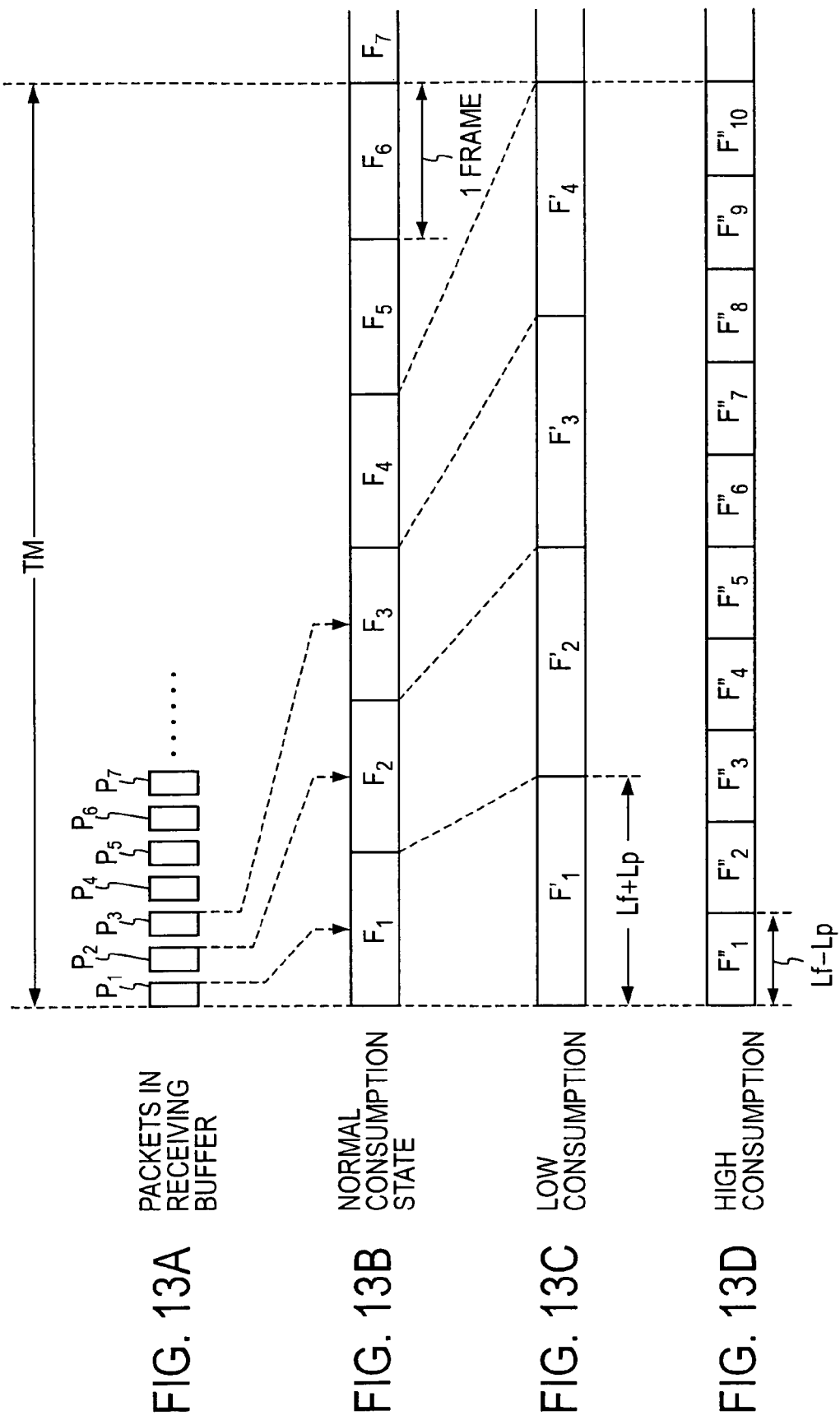

FIG. 15

TABLE 1

|  | VOICE SEGMENT | NON-VOICE SEGMENT |
|---|---|---|
| URGENCY LEVEL IS HIGH | SET TO A OR C | |
| URGENCY LEVEL IS MEDIUM | | |
| URGENCY LEVEL IS LOW | FIX AT B | SET TO A OR C |
| URGENCY LEVEL IS 0 (CURRENT STATE IS MAINTAINED) | FIX AT B | |

FIG. 16

TABLE 2

|  | VOICE SEGMENT | NON-VOICE SEGMENT |
|---|---|---|
| URGENCY LEVEL IS HIGH | SET TO A OR C | |
| URGENCY LEVEL IS MEDIUM | | |
| URGENCY LEVEL IS LOW | SET TO A OR C EVERY N1-th FRAME. FIXED AT B FOR OTHER FRAMES. (N1=5, FOR EXAMPLE) | SET TO A OR C |
| URGENCY LEVEL IS 0 (CURRENT STATE IS MAINTAINED) | FIX AT B | |

FIG. 17

TABLE 3

|  | VOICE SEGMENT | NON-VOICE SEGMENT |
|---|---|---|
| URGENCY LEVEL IS HIGH | SET TO A OR C | |
| URGENCY LEVEL IS MEDIUM | SET TO A OR C EVERY N2-th FRAME. FIXED AT B FOR OTHER FRAMES. (N2=2, FOR EXAMPLE) | SET TO A OR C |
| URGENCY LEVEL IS LOW | SET TO A OR C EVERY N1-th FRAME. FIXED AT B FOR OTHER FRAMES. (N1=5, FOR EXAMPLE) | SET TO A OR C |
| URGENCY LEVEL IS 0 (CURRENT STATE IS MAINTAINED) | FIX AT B | |

FIG. 18

TABLE 4

|  | VOICE SEGMENT | NON-VOICE SEGMENT |
|---|---|---|
| URGENCY LEVEL IS HIGH | SET TO A OR C EVERY N3-th FRAME. FIXED AT B FOR OTHER FRAMES. (N3=1, FOR EXAMPLE) ||
| URGENCY LEVEL IS MEDIUM | SET TO A OR C EVERY N2-th FRAME. FIXED AT B FOR OTHER FRAMES. (N2=2, FOR EXAMPLE) | SET TO A OR C EVERY N4-th FRAME. FIXED AT B FOR OTHER FRAMES. (N4=1, FOR EXAMPLE) |
| URGENCY LEVEL IS LOW | SET TO A OR C EVERY N1-th FRAME. FIXED AT B FOR OTHER FRAMES. (N1=5, FOR EXAMPLE) | SET TO A OR C EVERY N5-th FRAME. FIXED AT B FOR OTHER FRAMES. (N5=2, FOR EXAMPLE) |
| URGENCY LEVEL IS 0 (CURRENT STATE IS MAINTAINED) | FIX AT B ||

TABLE 5

|  | VOICED SOUND SEGMENT | UNVOICED SOUND SEGMENT | BACKGROUND NOISE SEGMENT | SILENCE SEGMENT |
|---|---|---|---|---|
| URGENCY LEVEL IS HIGH | SET TO A OR C | | | |
| URGENCY LEVEL IS MEDIUM | EVERY N6-th FRAME | EVERY N7-th FRAME | EVERY N8-th FRAME | EVERY N9-th FRAME |
| URGENCY LEVEL IS LOW | EVERY N10-th FRAME | EVERY N11-th FRAME | EVERY N12-th FRAME | EVERY N13-th FRAME |
| URGENCY LEVEL IS 0 | FIX AT B (CURRENT STATE IS MAINTAINED) | | | |

SOUND PACKET REPRODUCING METHOD, SOUND PACKET REPRODUCING APPARATUS, SOUND PACKET REPRODUCING PROGRAM, AND RECORDING MEDIUM

TECHNICAL FIELD

The present invention relates to a reproducing method, apparatus, and program, and a recording medium having the program recorded thereon, used for reproducing a sound signal such as digitized voice and music (hereinafter collectively called an audio signal) sent through a packet communication network such as the Internet with a stable quality at a receiving end.

BACKGROUND ART

Services that use Voice over IP technology (hereinafter simply referred to as audio packet communication) to transmit or receive audio signals are becoming widespread. FIG. 1 shows an outline of such a service. An input audio signal is converted into audio packets in an audio signal transmitting device 5 and sent to a packet communication network 6. An audio signal receiving device 7 identifies and receives audio packets destined to it, and decodes them to output speech.

FIG. 2 shows the relationship between an audio data stream to be sent and audio packets. FIG. 2A shows the audio data stream to be transmitted. The audio data stream to be sent typically consists of a PCM digital sample string. The digital audio data stream is divided into equal time units (typically 10 to 20 milliseconds or so) called frames, which are then encoded into audio codes. Information such as a timestamp indicating the time when the audio code is sent out is added to the audio code, which is then sent as an audio packet. Audio packets are an intermittent signal compressed along the time axis as shown in FIG. 2B and the gaps in the intermittent signal are used for other packet transmissions. The interval between transmission timings for sending out packets from the audio signal transmitting device 5 is equivalent to the frame length of the audio data stream. The audio packets are sent to the packet communication network 6 at time intervals of one frame length.

The audio signal receiving device 7 receives audio packets which arrive at time intervals of one frame length and decodes the audio packets. One audio packet is decoded into one frame length of audio data stream as shown in FIG. 2C. Thus, the audio signal receiving device 7 can reproduce continuous sound by receiving audio packets at time intervals of one frame length.

There is a problem that substantial variations in packet arrival time arise depending on the conditions of the communication network and, as a result, packets may not arrive within a time limit (time equivalent to one frame length) and discontinuities may occur in reproduced sound. One known method for solving the problem is to provide a receiving buffer, also known as a jitter absorption buffer, to constantly store a predetermined number of packets. A problem is that if the number of packets to be stored in the receiving buffer is chosen to be a large value, large packet arrival jitter can be absorbed but a large amount of delay between reception of a packet and reproduction of sound, namely communication delay, occurs, which may make the quality of two-way voice communications awkward. On the other hand, if the number of packets to be stored in the receiving buffer is chosen to be a small value, delay in voice communication will be small but audible discontinuities will be more likely to occur when packet arrival jitter occurs. That is, there is a trade-off between communication delay and the likelihood of audible discontinuities.

One known method for solving this problem is to dynamically control the number of packets to be stored in the receiving buffer. In this method, at the beginning of communication, the number of packets to be stored in the receiving buffer is set to a small value to reduce communication delay, and when the packets stored in the buffer run out during the communication, the reproduction of sound is temporarily stopped to increase the number of packets stored in the receiving buffer by a given number to reduce the likelihood of audible discontinuities in the subsequent voice communication.

It is said that several tens of percent of the time of normal utterance are non-voice segments (background noise and silence segments) when human utterance is divided into time units of 10 to 20 milliseconds. Therefore, jitter can be addressed as follows. When the number of packets in the receiving buffer exceeds a first threshold, a non-voice segment in the decoded audio is removed to shorten the frame length, thereby quicken access to the next packet in the receiving buffer to use for sound reproduction. When the number of packets in the receiving buffer becomes smaller than a second threshold smaller than the first threshold, then a non-voice segment in the decoded audio signal is expanded to delay access to the next packet in the receiving buffer to use for sound reproduction. However, this method cannot provide control using the receiving buffer if the frequency of non-voice segment occurrences is significantly low or a non-voice segment does not occur over a long period of time.

Non-patent literature 1 describes that the time length can be increased or decreased without significant degradation of perceived audio quality by inserting or removing pitch waveforms as a unit in voice segments (a voiced sound segment and an unvoiced sound segment). Patent literature 1 describes that interpolated pitch-period audio waveforms are added in a voice segment when the number of packets stored in a receiving buffer becomes lower than a lower limit and some of the pitch-period audio waveforms in a voice segment are removed when the number of packets exceeds an upper limit in order to solve the problem with the method that the receiving buffer cannot adequately be controlled by solely using non-voice segments. Although degradation of audio quality can be reduced by inserting or removing pitch waveforms, the sound quality of reproduced sound can be degraded to an undesirable extent because the insertion and removal of pitch-period waveforms are performed on a series of frames until the number of packets stored in the buffer reaches a value between the upper and lower thresholds. Moreover, because the upper and lower thresholds are fixed, sudden changes in jitter cannot be managed and consequently packet loss may occur.

Patent literature 1: Japanese Patent Application Laid-Open No. 2003-050598

Non-patent literature: Morita and Itakura, "Time-Scale Modification Algorithm for Speech by Use of Pointer Interval Control OverLap and Add (PICOLA) and Its Evaluation", Discourse Collected Papers of Acoustical Society of Japan, 1-4-14, Oct., 1986

DISCLOSURE OF THE INVENTION

Problems to be Solved by the Invention

An object of the present invention is to provide a reproducing method and apparatus for audio packets that has improved functionality by using insertion and removal of pitch waveforms.

Means to Solve Problems

According to the present invention, a reproducing method for receiving a stream of sent audio packets containing audio codes generated by encoding an audio data stream frame by frame and reproducing an audio signal includes the steps of:

(a) storing received packets in a receiving buffer;

(b) detecting the largest delay jitter and the number of buffered packets, the largest jitter being any of the largest value and statistical value of jitter obtained by observing arrival jitter of the received packets over a given period of time and the number of buffered packets being the number of packets stored in the receiving buffer;

(c) obtaining from the largest delay jitter an optimum number of buffered packets by using a predetermined relation between the largest delay jitter and the optimum number of buffered packets, the optimum number of buffered packets being the optimum number of packets to be stored in the receiving buffer;

(d) determining, on a scale of a plurality of levels, the difference between the detected number of buffered packets and the optimum number of buffered packets;

(e) retrieving a packet corresponding to the current frame from the receiving buffer and decoding an audio code in the packet to obtain a decoded audio data stream in the current frame; and (f) performing any of expansion, reduction, and preservation of a waveform of the decoded audio data stream in the current frame in accordance with a rule to make the number of buffered packets close to the optimum number of buffered packets, the rule being established for each level of the difference, and outputting the result as audio data of the current frame.

According to the present invention, a reproducing apparatus for audio packets which receives a stream of sent audio packets containing audio codes generated by encoding an audio data stream frame by frame and reproduces an audio signal includes:

a packet receiving part which receives audio packets from a packet communication network;

a receiving buffer for temporarily storing the received packets and reading out packets in response to a request;

a state detecting part which detects the largest delay jitter and the number of buffered packets, the largest jitter being any of the largest value and statistical value of jitter obtained by observing arrival jitter of the received packets over a given period of time and the number of buffered packets being the number of packets stored in the receiving buffer;

a control part which obtains from the largest delay jitter an optimum number of buffered packets by using a predetermined relation between the largest delay jitter and the optimum number of buffered packets, the optimum number of buffered packets being the optimum number of packets to be stored in the receiving buffer, determines, on a scale of a plurality of levels, the difference between the detected number of buffered packets and the optimum number of buffered packets, and generates a control signal for instructing to perform any of expansion, reduction, and preservation of a waveform of the decoded audio data stream in accordance with a rule to make the number of buffered packets close to the optimum number of buffered packets, the rule being established for each level of the difference;

an audio packet decoding part which decodes an audio code in a packet corresponding to the current frame extracted from the receiving buffer to obtain a decoded audio data stream in the current frame;

a consumption adjusting part which performs any of expansion, reduction, and preservation of the waveform of the decoded audio data stream in the current frame in accordance with a rule and outputs the result as sound data of the current frame.

Effects of the Invention

By applying the present invention to communication in which audio signals are communicated in real time over a packet communication network where a large amount of packet arrival delay jitter occurs, the consumption of an audio data stream can be steadily controlled to adjust the number of packets in a receiving buffer regardless of the presence or absence of voice, therefore an optimum control of the receiving buffer can be performed according to changes in the conditions (jitter time) of the communication network. Consequently, voice communication without audible discontinuities in speech and with minimized voice communication delay can be implemented. Most packet communication networks are designed to tolerate a certain degree of jitter in order to save costs. The use of the present invention also has the effect of saving costs relating to network use because audible discontinuities do not occur without using a high-quality network where jitter caused by the network itself is small.

BRIEF DESCRIPTION OF THE DRAWINGS

FIG. 4 is a table showing optimum buffer level versus largest delay jitter;

FIG. 8 is a waveform chart schematically illustrating waveform expanding processing performed by the frame waveform expanding part 21 shown in FIG. 7;

FIG. 13 is a timing chart illustrating operation of a consumption adjusting part 20 shown in FIG. 11;

FIG. 15 shows Table 1 showing an example of control by the consumption adjusting part 20 in accordance with the urgency level;

FIG. 16 shows Table 2 showing an example of control by the consumption adjusting part 20 in accordance with the urgency level;

FIG. 17 shows Table 3 showing an example of control by the consumption adjusting part 20 in accordance with the urgency level;

FIG. 18 shows Table 4 showing an example of control by the consumption adjusting part 20 in accordance with the urgency level;

BEST MODES FOR CARRYING OUT THE INVENTION

The present invention can be carried out by a computer and a computer program or carried out by implementing it on a digital signal processor or a dedicated LSI. In particular, a selector switch can be implemented as a conditional branch in a computer program.

First Embodiment

Figure 1:
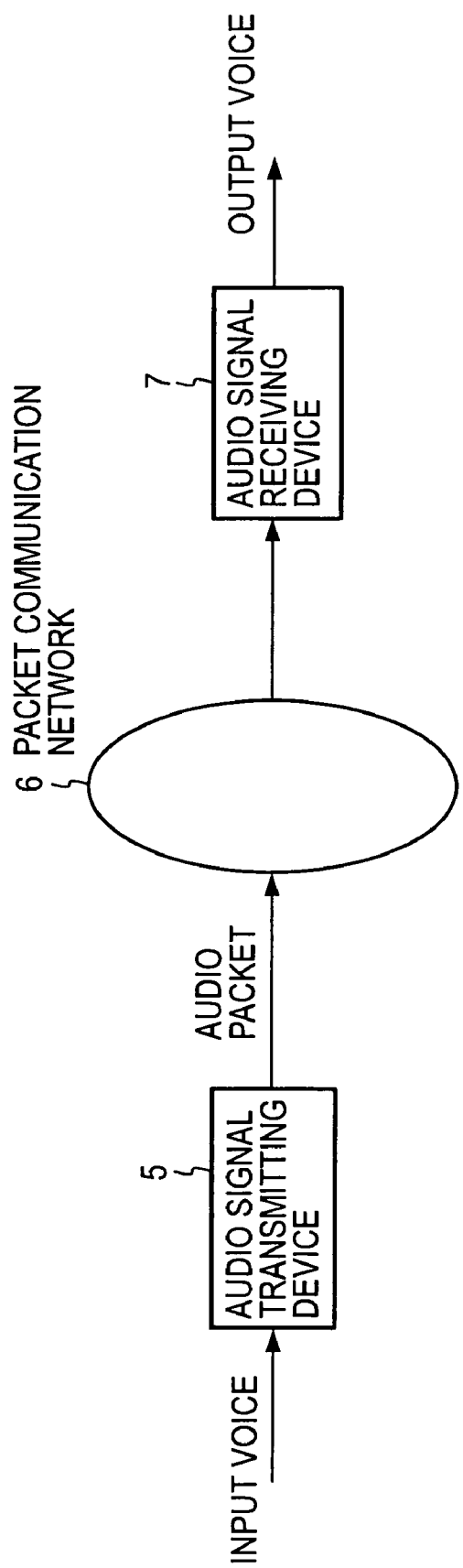
FIG. 1 is a block diagram illustrating an outline of packet communication.
Figure 2:
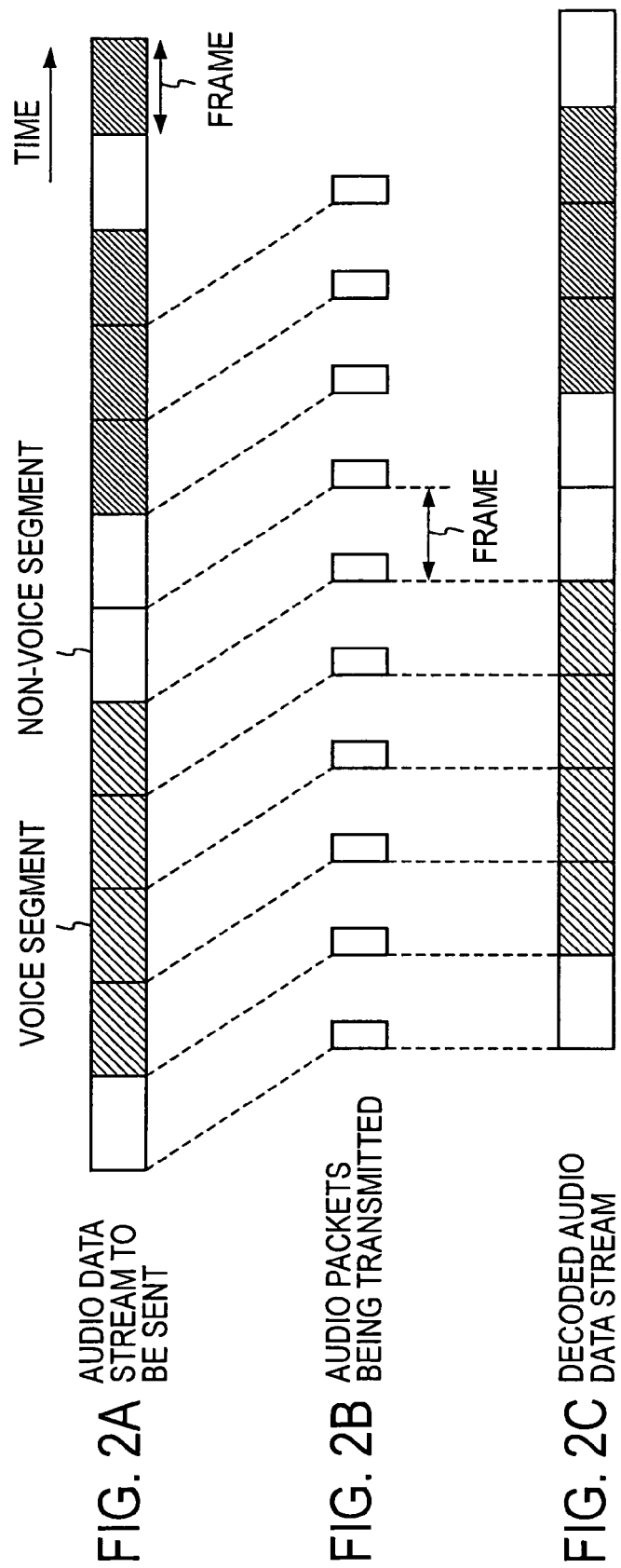
FIG. 2 is a timing chart illustrating an outline of packet communication.
Figure 3:
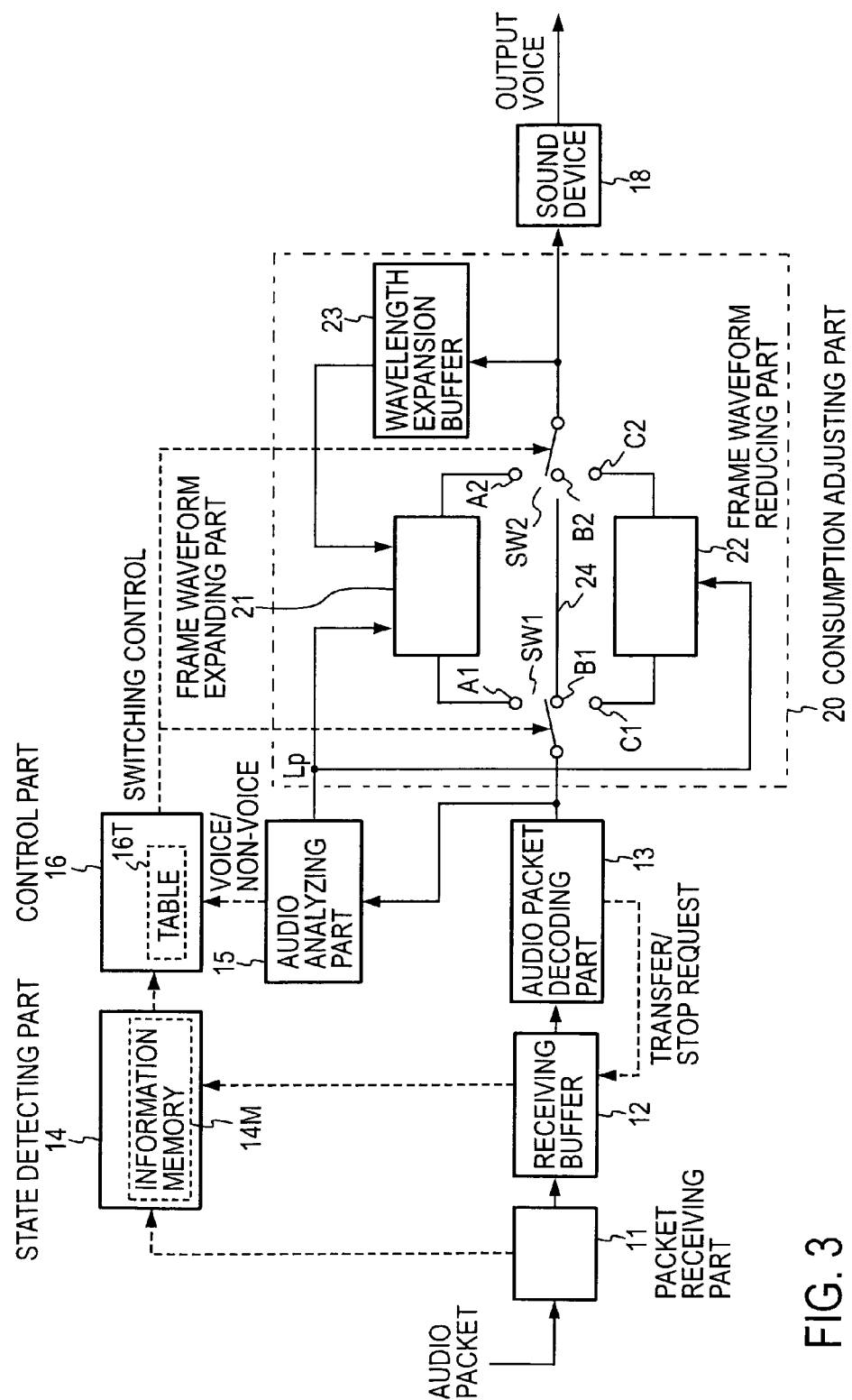
FIG. 3 is a block diagram illustrating one embodiment of a reproducing apparatus for audio packets according to the present invention.

FIG. 3 shows an exemplary configuration of an audio signal receiving part according to the present invention, which includes a packet receiving part 11, a receiving buffer 12, an audio packet decoding part 13, a state detecting part 14, an audio analyzing part 15, a control part 16, a consumption adjusting part 20, and a sound device 18. The packet receiving part 11 receives audio packets from a communication network, stores them in the receiving buffer 12, and provides their arrival times and timestamps to the state detecting part 14. An audio packet contains an audio code generated by dividing an audio signal into time units having a given length (typically 10 to 20 milliseconds or so) called frames and converting the audio signal in the time unit by using an audio encoding technique, and a timestamp (corresponding to a frame number) indicating the order in time of the generation of the packet. A typical audio encoding technique is G.711 which is an ITU-T (International Telecommunications Union) standard. However, any other technique may be used.

The receiving buffer 12 stores received audio packets and, each time a transfer request arrives from the audio packed decoding part 13, sends the audio packets to the audio packet decoding part 13 in the order of timestamp. Each time an audio packet is transferred from the receiving buffer 12 to the audio packet decoding part 13, that packet in the receiving buffer is discarded.

The audio packet decoding part 13 decodes the audio code contained in audio packets to output an audio data stream and provides it to the consumption adjusting part 20 and the audio analyzing part 15. The term "audio data stream" as used herein refers to a digital audio sample string, which is typically handled in PCM format. Whether an audio signal is analog or digital is not specifically indicated in the following description, any signal being processed is a digital signal and a signal ultimately perceived by a human is an analog signal.

A sending end may encode a PCM signal, frame by frame, and send it in packets or may send each frame of a PCM signal in a packet without encoding. In the former case, means for decoding the audio code extracted from received packets must be provided at the receiving end; in the latter case, such means is not required. However, given that a PCM signal is a kind of code, then decoding means for converting the PCM signal extracted from the packets into a digital audio signal must be provided at the receiving end. The audio packet decoding part 13 in the reproducing apparatus shown in FIG. 3 may be either of these cases.

The state detecting part 14 is supplied with the arrival time and time stamp of a packet received at the packet receiving part 11, detects delay jitter, detects the number of packets stored in the receiving buffer 12, and presents it to the control part 16. For simplicity, the time stamp of the current packet is assumed to be the same as the frame number $F_n$ (n=0, 1, 2, . . . ), the arrival time is denoted by $T_n$, the timestamp of the immediately preceding packet is denoted by $F_{n-m}$, and its arrival time is denoted by $T_{n-m}$. If variations in delay in a signal transmission channel are small, then m is typically 1. If the amount of delay varies significantly, then m is not necessarily 1 because the order of arrived packets can change. The length of a frame is denoted by Lf and delay jitter $j_n$ is represented by $j_n = (T_n - T_{n-m}) - m \times Lf$ or its absolute value. Jitter $J_n$ may be defined by any other definitional equation that can express the level of jitter by a numerical value.

The state detecting part 14 holds in an internal information memory 14M the arrival time $T_{n-m}$ and timestamp $F_{n-m}$ of the previously received packet and also holds jitters $j_n, j_{n-1}, \ldots$ calculated for the packets received in a given period of time (for example 2 seconds) in the past. The largest value or a statistical value of jitters in a given past period of time (2 seconds) at the time the current packet (with time stamp $F_n$) is received (hereinafter referred to as the largest delay jitter) is denoted by J. Alternatively, J may be the largest among jitters of a predetermined number of received packets (for example, 100 packets), rather than in a given period of time. The state detecting part 14 obtains the largest delay jitter J and provides it to the control part 16 along with the number of packets currently stored in the receiving buffer 12 (buffer level) each time the arrival time $T_n$ and timestamp $F_n$ of a packet is provided from the packet receiving part 11.

The audio analyzing part 15 first analyzes a decoded audio data stream outputted from the audio packet decoding part 13 to determine whether the current frame is in a voice segment or a non-voice segment. The term "voice segment" as used herein is defined as a segment containing an audio signal of human utterance and the term "non-voice segment" as used herein is defined as a segment that does not contain such an audio signal. A voice segment is either a voiced sound segment or an unvoiced sound segment, and a non-voice segment is a segment that is not a voice segment, that is, either a background noise segment or a silence segment. Determination as to whether a frame is in a voice segment or not can be made as follows, for example. The power of the audio signal in the frame is calculated and, if the power is greater than or equal to a threshold, it is determined that the frame is a voice frame (in a voce segment). Otherwise, it is determined that the frame is a non-voice frame (in a non-voice segment).

If it is determined that the frame is in a voice segment, the frame is analyzed to find a pitch length. The pitch length can be obtained by calculating the autocorrelation coefficient of an audio waveform or of a signal of an audio waveform passed through a filter having the inverse characteristic of the spectral envelope. If it is determined that the frame is in a non-voice segment, pitch length analysis is not performed, instead, a constant value, for example ½ of the frame length Lf is set as the pitch length Lp. This is because the pitch length Lp that is equal to or less than ½ of the frame length Lf is convenient for subsequent processing. The pitch length Lp may be any value that is less than ½ of the frame length, such as ¼ or ⅙ of the frame length Lf.

Even if it is determined that the frame is in a voice segment, the voice may be a voiced sound or an unvoiced sound. Unvoiced sounds do not have a pitch, which is a physical feature value of voice. In that case, a value obtained by a pitch analysis technique may also be used as the pitch length in subsequent processing or a constant value may be set as the pitch length, as in the case of a non-voice segment, without substantially affecting the effects of the present invention.

In background noise segments (segments other than voice segments) including background noise, the pitch length is calculated by using the pitch analysis technique as in the case of voice segments. Although the pitch length obtained differs from the pitch that is a physical feature value of voice, it is used as the periodicity corresponding to the main fundamental frequency of a signal. Depending on the audio encoding method used, an audio code may contain information concerning the pitch. In that case, the pitch information in the audio code may be used to obtain the pitch length.

The control part 16 has a table 16T for example as shown in FIG. 4 specifying largest delay jitters and their corresponding optimum numbers of packets to be buffered in the receiving buffer 12, which have been determined beforehand through experiments. The table 16T shown in FIG. 4 is for the case where the frame length Lf is 20 msec and hence the ideal arrival interval between adjacent packets is also 20 msec. The control part 16 determines an urgency level for adjusting the buffer level required for the receiving buffer 12 on the basis of the difference, S−B, between the optimum number of packets, B, obtained with reference to the Table 16T using the largest delay jitter J provided from the state detecting part 14 and the number of packets, S, currently stored in the receiving buffer 12. Alternatively, an equation that approximately expresses the relationship between the largest delay jitter J and the optimum number of packets to be buffered B, for example, may be determined beforehand and used instead of the table 16T. That is, any method may be used that uses a predetermined relationship between the largest delay jitter J and the optimum number of packets to be buffered B.

The control part 16 determines whether to expand or reduce or not to change the decoded audio waveform data in the current frame sent from the audio packet decoding part 13, on the basis of the determined urgency level and the result of voice/non-voice determination sent from the audio analyzing part 15, and provides control based on the determination to the consumption adjusting part 20.

The consumption adjusting part 20 outputs intact, or expands and outputs, or reduces and outputs the decoded audio waveform data sent from the audio packet decoding part 13 in accordance with the control by the control part 16. If the decoded audio waveform is expanded, the next packet transfer request sent from the audio packet decoding part 13 to the receiving buffer 12 delays and consequently the packet consumption per unit time decreases. In contrast, if the decoded audio waveform is reduced, the packet consumption per unit time increases. That is, the number of frames to be processed per unit time to output the audio signal is controlled to control the number of packets read out of the receiving buffer 12.

The sound device 18 has a digital/analog converter, not shown, converts an audio data stream into an analog signal and actually reproduces the signal through a speaker. When a digital audio signal is sent from the consumption adjusting part 20 to the sound device 18, an output sound, which is an analog audio signal, is reproduced. After the reproduction for the received signal for a time length (time equivalent to 1 frame) is completed, the sound device 18 receives the decoded audio data stream in the next packet. Typically, the sound device 18 includes sound device buffers. A technique called double buffering is well known. Double buffering is a technique in which two buffers are provided and while one of them is in use for reproduction, the other receives a signal for preparation of next reproduction. When the buffer is full, the next signal is not received until the completion of reproduction for the signal. When a space accommodating the next signal in the buffer becomes available, the next signal is immediately read into the buffer.

Figure 5A:
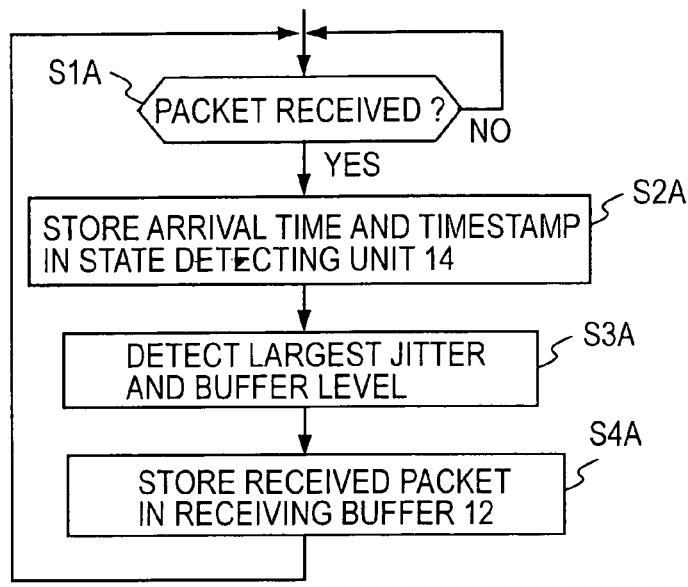
FIG. 5A shows a process for processing received packets and FIG. 5B shows a process for reading, decoding, and waveform processing of packets.
Figure 5B:
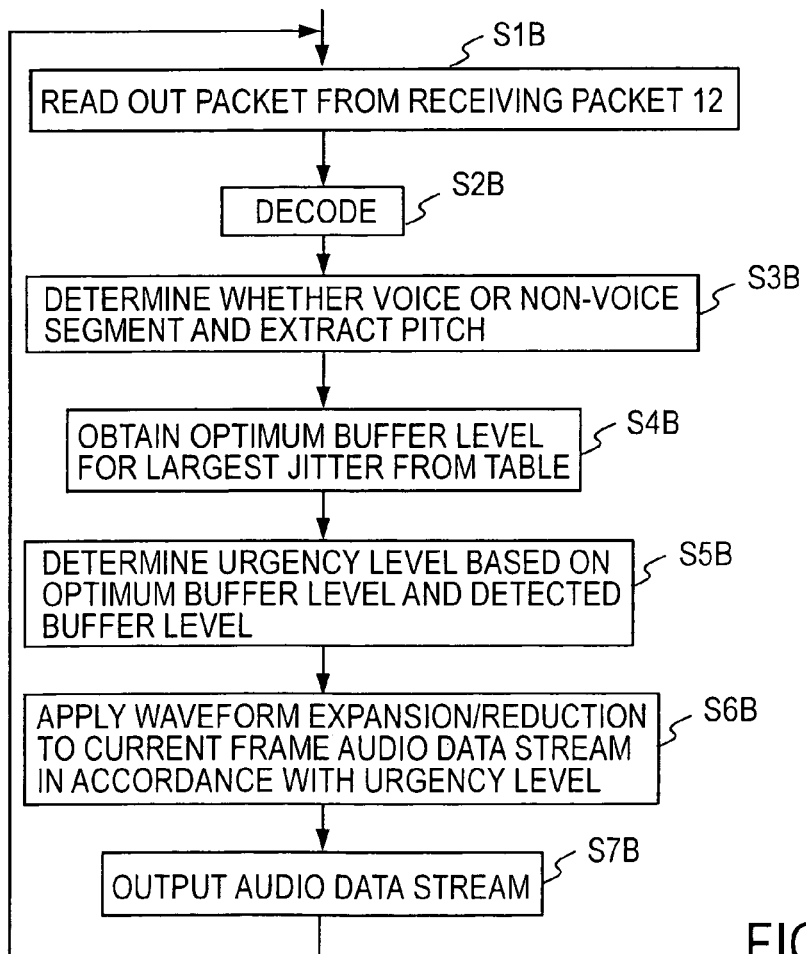

FIGS. 5A and 5B show the above-mentioned process for processing received packets performed by the packet receiving part 11, the receiving buffer 12, and the state detecting part 14 and a process for reproducing an audio data stream performed by the other components in the reproducing apparatus for audio packets according to the present invention shown in FIG. 13.

When an audio packet is received by the packet receiving part 11 at step S1A in the process shown in FIG. 5A, the timestamp and arrival time of the received packet are stored in the state detecting part 14 at step S2A.

At step S3A, delay jitter with respect to the immediately previously received packet is obtained based on the arrival time and timestamp of the received packet by the state detecting part 14, is stored along with the arrival time and the time stamp, the largest delay jitter J in a given past period of time is obtained, the number of packets currently stored in the receiving buffer 12 (buffer level) S is obtained, and the largest delay jitter J and the buffer level S are provided to the control part 16.

At step S4A, the received packet is stored in the receiving buffer 12, then the process returns to step S1A, where the next packet is waited for.

In the process shown in FIG. 5B, in response to a request from the audio packet decoding part 13, the packet corresponding to the current frame in the reproduction process is read out of the receiving buffer 12 at step S1B, and the audio code in the packet is decoded by the audio packet decoding part 13 to obtain an audio data stream at step S2B.

At step S3B, determination is made by the audio analyzing part 15 as to whether the decoded audio data stream is in a voice segment or a non-voice segment. At step S4B, an optimum buffer level B for the largest delay jitter J is determined by the control part 16 using the table shown in FIG. 4.

At step S5B, the urgency level for adjusting the buffer level is determined by the control part 16 on the basis of the optimum buffer level B and the detected buffer level S.

At step S6B, the waveform of the decoded audio data stream in the current frame is expanded or reduced by the consumption adjusting part 20 according to the determined urgency level.

At step S7B, the waveform-expanded or -reduced audio data stream is outputted and then the process returns to step S1B to proceed to the reproduction process for the next packet.

Main components of the audio packet receiving apparatus according to the present invention shown in FIG. 3 will be described below in detail.

Figure 6:
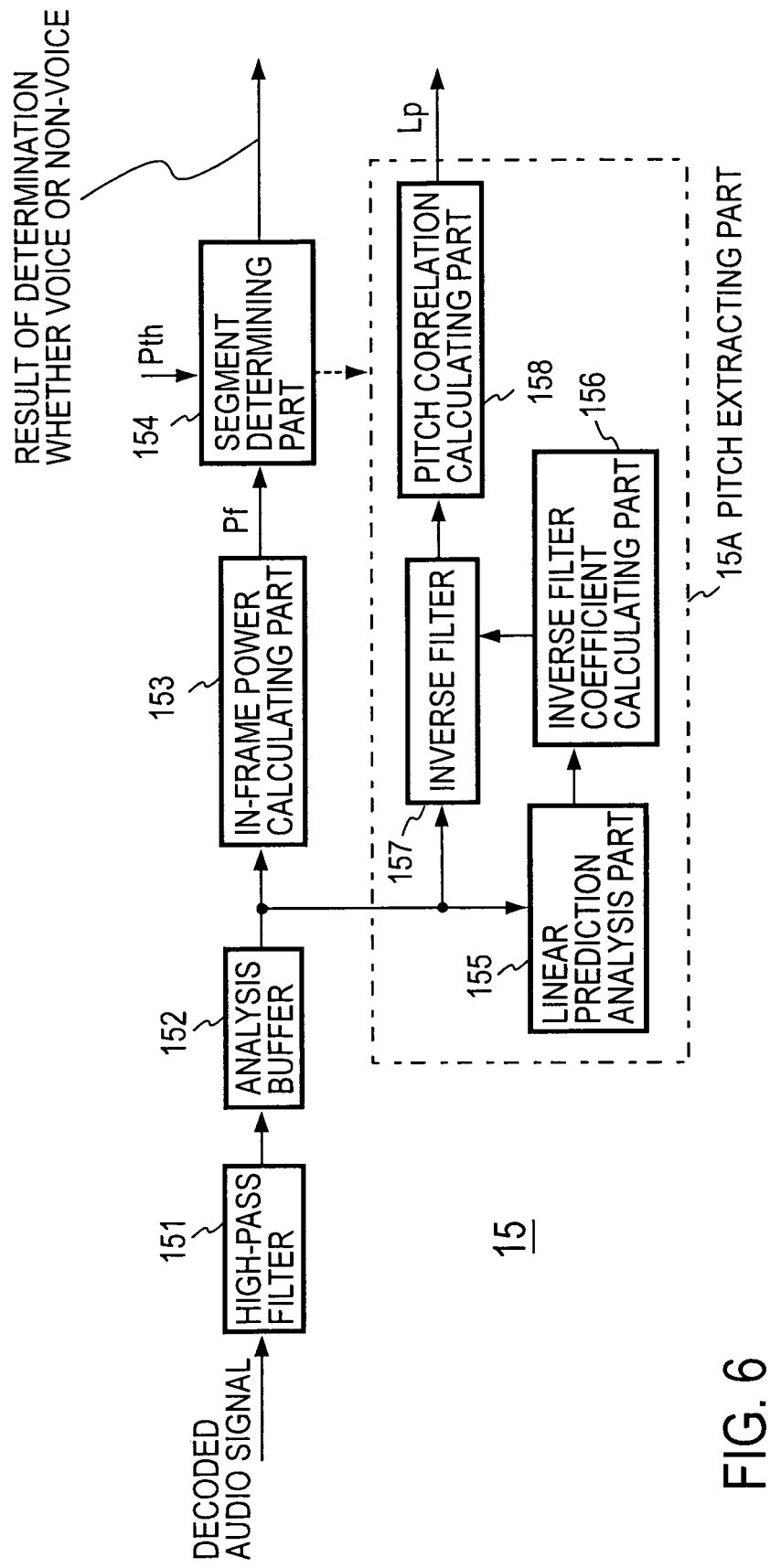
FIG. 6 is a block diagram showing an exemplary configuration of an audio analyzing part 15 shown in FIG. 3.

FIG. 6 shows an exemplary functional configuration of the audio analyzing part 15. The audio analyzing part 15 herein includes a high-pass filter 151, an analysis buffer 152, an in-frame power calculating part 153, a segment determining part 154, and a pitch extracting part 15A. Direct-current components and extremely low frequency components (for example frequency components lower than or equal to 50 Hz) that are intrinsically not contained in voice are removed from decoded audio data sent from the audio packet decoding part 13 frame by frame by the high-pass filter 151. Then the decoded audio data is temporarily stored in the analysis buffer 152 for the subsequent processing and the power Pf in the frame is calculated by the in-frame power calculating part 153. The segment determining part 154 determines that the frame is in a voice segment if the power Pf in the frame is greater than a predetermined power threshold Pth, otherwise, it determines that the frame is in a non-voice segment, and outputs the result of the determination.

A pitch extracting part 15A performs pitch extracting processing for extracting a pitch from the decoded audio data stream if the segment determining part 154 determines that the frame is in a voice segment. The pitch extracting part 15A includes a linear prediction analysis part 155, an inverse filter coefficient calculating part 156, an inverse filter 157, and a pitch correlation calculating part 158. The linear prediction analysis part 155 performs linear prediction analysis of a decoded audio data stream in one frame which is held in the analysis buffer 152 to obtain linear predictive coefficients and provides them to the inverse filter coefficient calculating part 156. The inverse filter coefficient calculating part 156 calculates inverse filter coefficients, that flatten the spectral envelope of the decoded audio signal, from the linear predictive coefficients and sets the result as the coefficients for the inverse filter 157, which is implemented by a linear filter. Therefore, the inverse filter 157 inverse-filters the decoded audio data stream provided, and provides an audio data stream whose spectral envelope is flattened to the pitch correlation calculating part 158. The pitch correlation calculating part 158 calculates the autocorrelation value of the provided audio data while sequentially shifting the sample point to detect the interval between peaks in a series of correlation values as the pitch length Lp and provides it to the consumption adjusting part 20.

A signal in past frames is often used in addition to the signal in the current frame for the pitch length analysis. In such a case, the size of the analysis buffer 152 may be chosen to be a value greater than or equal to 2 frames, decoded audio data streams in the current and past frames may be held, and pitch length analysis of the audio data stream in the past and current frames may be performed. The result of determination as to whether the frame is in voice segment or a non-voice segment is sent to the control part 16 and the pitch length Lp is sent to the consumption adjusting part 20, which adjusts the consumption of audio data stream.

Returning to FIG. 3, the consumption adjusting part 20 includes a frame waveform expanding part 21, a frame waveform reducing part 22, a waveform expansion buffer 23, a through-path 24, and switches SW1, SW2. Switch SW1 has three selector terminals A1, B1, and C1, and switch SW2 has three selector terminals A2, B2, and C2. Connected between selector terminals A1 and A2, between selector terminals B1 and B2, between selector terminals C1 and C2 are the frame waveform expansion part 21, through-path 24, and frame waveform reducing part 22, respectively. The switches are switched in conjunction with each other to select any of these under the control of the control part 16. An audio waveform data stream selected by switch SW2 is provided to the sound device 18 and is also written in the waveform expansion buffer 23. An audio signal read out of the waveform expansion buffer 23 is provided to the frame waveform expanding part 21.

Figure 7:
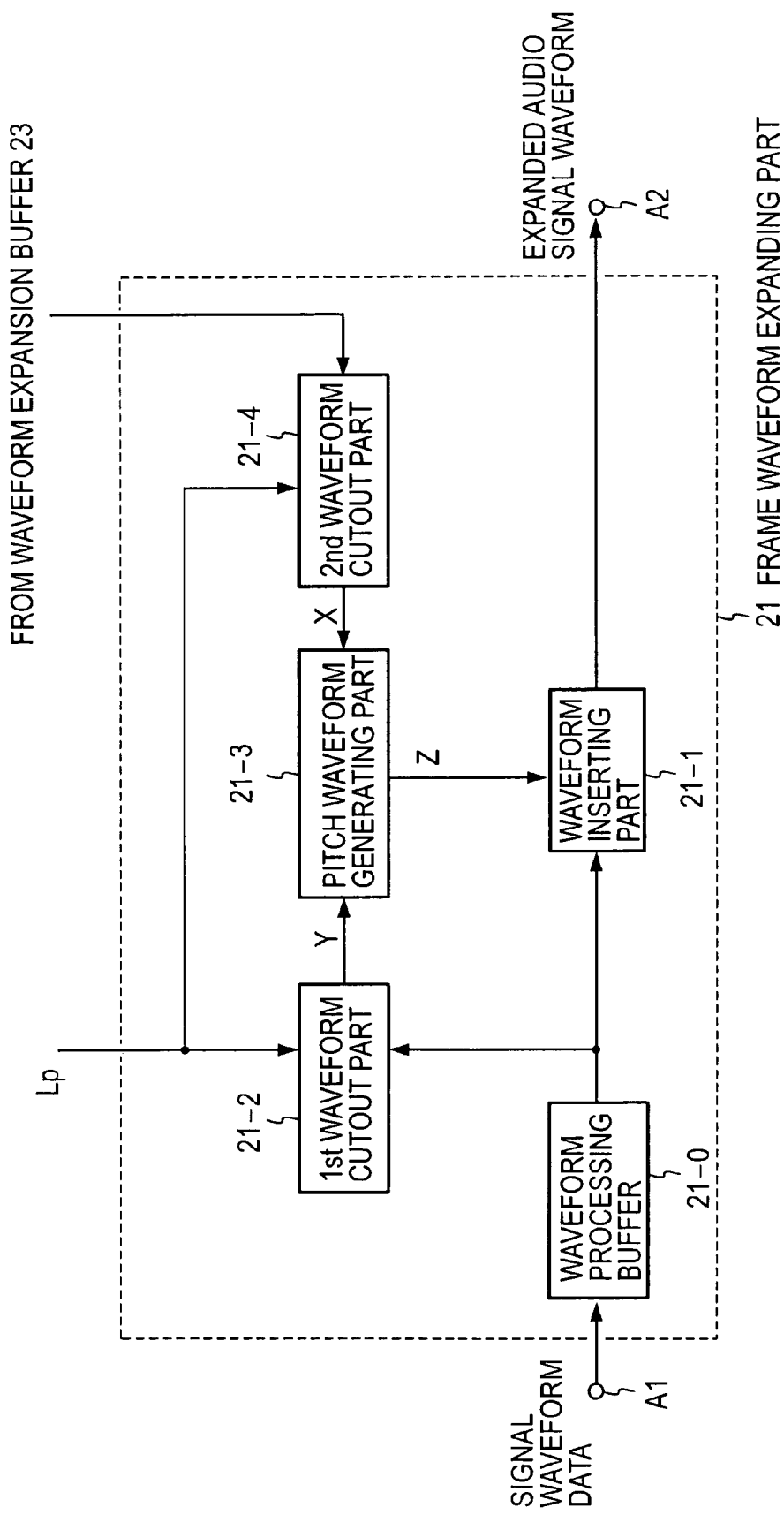
FIG. 7 is a block diagram showing an exemplary functional configuration of a frame waveform expanding part 21 shown in FIG. 3.

FIG. 7 shows an exemplary functional configuration of the frame waveform expanding part 21. FIG. 8 shows an example of waveform expansion processing performed by the frame waveform expanding part 21.

The frame waveform expanding part 21 includes a waveform processing buffer 21-0, a waveform inserting part 21-1, a first-waveform cutout part 21-2, a pitch waveform generating part 21-3, and a second-waveform cutout part 21-4. The second-waveform cutout part 21-4 uses the pitch length Lp provided from the audio analyzing part 15 to cutout a waveform X in the segment of the pitch length Lp shown in row A of FIG. 8 from the output audio signal waveform WF1 in the previous frame stored in the waveform expansion buffer 23. That is, a waveform X over 1 pitch length Lp from the last sample point in the buffer 23 toward the past is cut out.

The first-waveform cutout part 21-2 cuts out a waveform Y in the segment over the pitch length Lp in row A of FIG. 8 from the audio signal waveform WF0 in the current frame in the waveform processing buffer 21-0. That is, a waveform over 1 pitch length Lp from the first sample point of the audio signal waveform WF0 of the inputted current frame in the positive time direction is cut out.

The pitch waveform generating part 21-3 assigns weights to the cut-out waveforms X and Y by using triangular windows and then adds them together to generate the waveform Z shown in row B of FIG. 8. Here, the triangular window used for assigning the weights may be the same as the one described in non-patent document 1. That is, a shape in which the weight linearly changes from 0 at the start of the waveform segment to 1 at the end of the segment can be used for the waveform X and a shape in which the weight linearly changes from 1 at the start of the waveform segment to 0 at the end of the segment can be used for the waveform Y.

The waveform inserting part 21-1 inserts, as shown in row D of FIG. 8, the waveform Z in the segment of 1 pitch length Lp added to the beginning of the audio waveform of the current frame as shown in row C of FIG. 8.

While the waveform X is cut out from the signal in the 1 frame previous frame in the waveform expansion buffer 23 and the waveform Y is cut out from the signal in the current frame in the wave processing buffer 21-0, the audio waveform in the current frame alone may be used to generate a waveform to be inserted if the pitch length Lp is shorter than or equal to ½ of the frame length Lf. For example, as shown in row A of FIG. 9, waveforms X' and Y' corresponding to the waveforms X and Y in row A of FIG. 8 in the two contiguous pitch lengths from the beginning of the current frame are cut out, triangular windows are applied to the cut-out waveforms X' and Y', then add them together to generate a waveform Z' (in row B of FIG. 9), and the waveform Z' is inserted between the waveforms X' and Y' of the current frame to generate a waveform with a length of Lf+Lp (in row D of FIG. 9), thereby the same effect as that of the technique shown in FIG. 8 can be achieved.

Figure 9A:
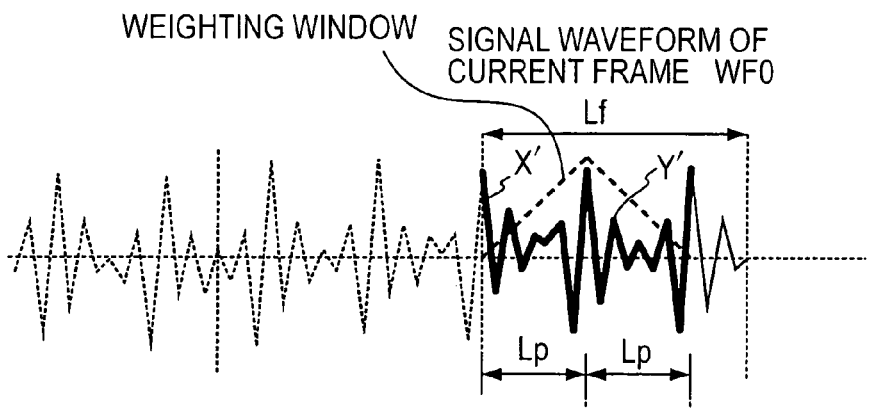
FIG. 9 is a waveform chart illustrating another example of waveform expansion processing performed by the frame waveform expanding part 21 shown in FIG. 7.
Figure 9C:
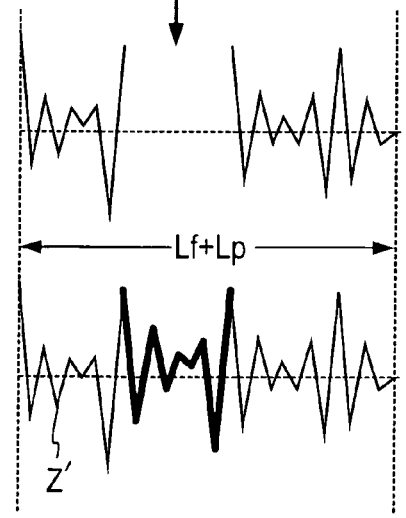
Figure 10:
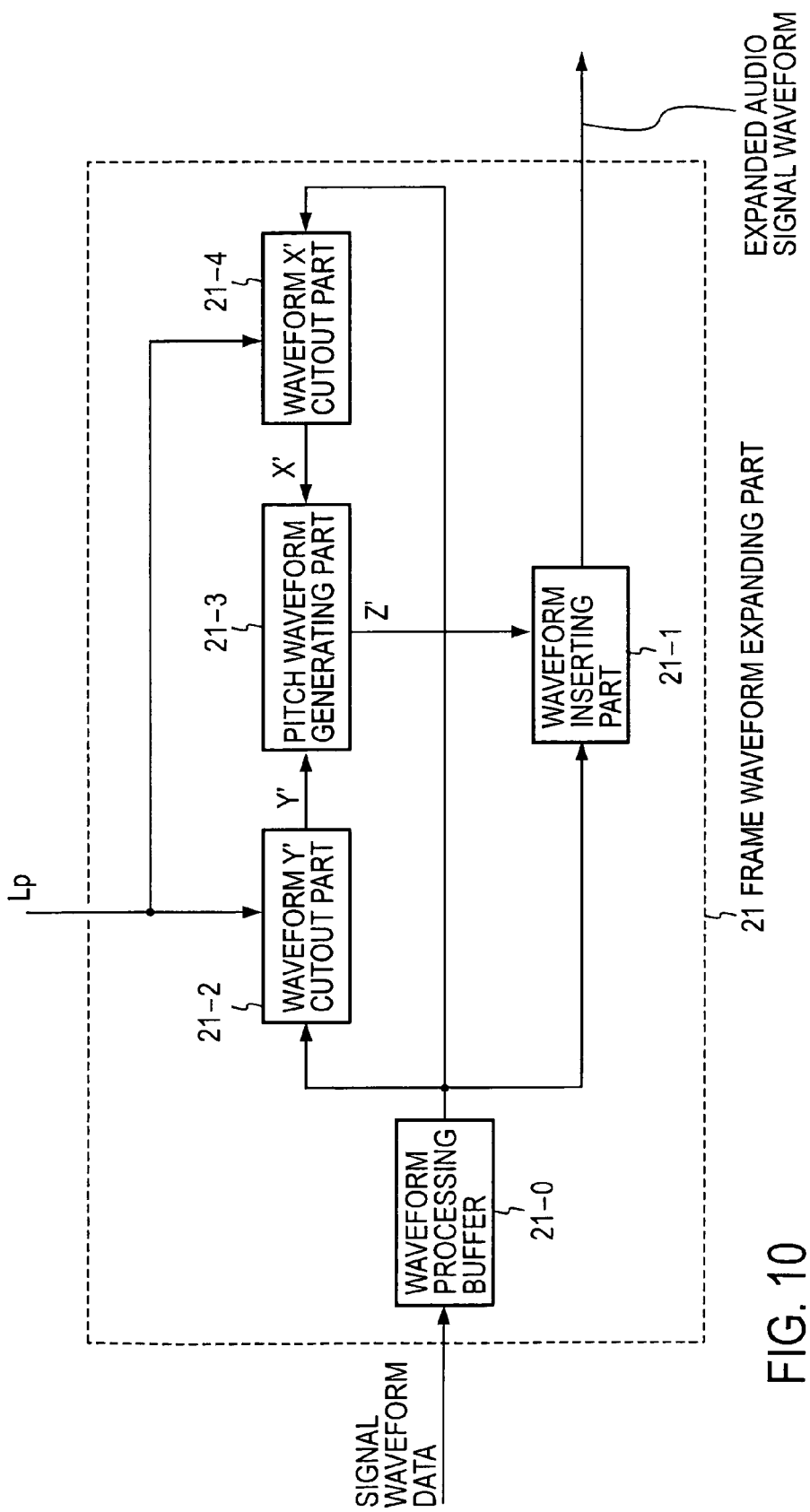
FIG. 10 is a block diagram showing another configuration of the waveform expanding part 21 shown in FIG. 3.

Although the technique shown in FIG. 9 has the advantage that the need for the waveform expansion buffer 23 used in the technique in FIG. 8 is eliminated, it has the disadvantage of limitation that the pitch length Lp must be less than or equal to ½ of the frame length. The waveform expansion process can be applied to cases where the pitch length Lp exceeds Lf/2 by choosing the size of the waveform processing buffer 21-0 to be a value accommodating 2 frames, for example, so that the waveforms of the current frame and the preceding frame can be held to perform expansion processing on the audio signal in the two frames.

As a result of the processing by the frame wavelength expanding part 21, the audio signal waveform of the current frame with the length Lf is transformed to an expanded signal waveform with the length Lf+Lp as shown in row D of FIG. 8 and row D of FIG. 9 and outputted.

Figure 11:
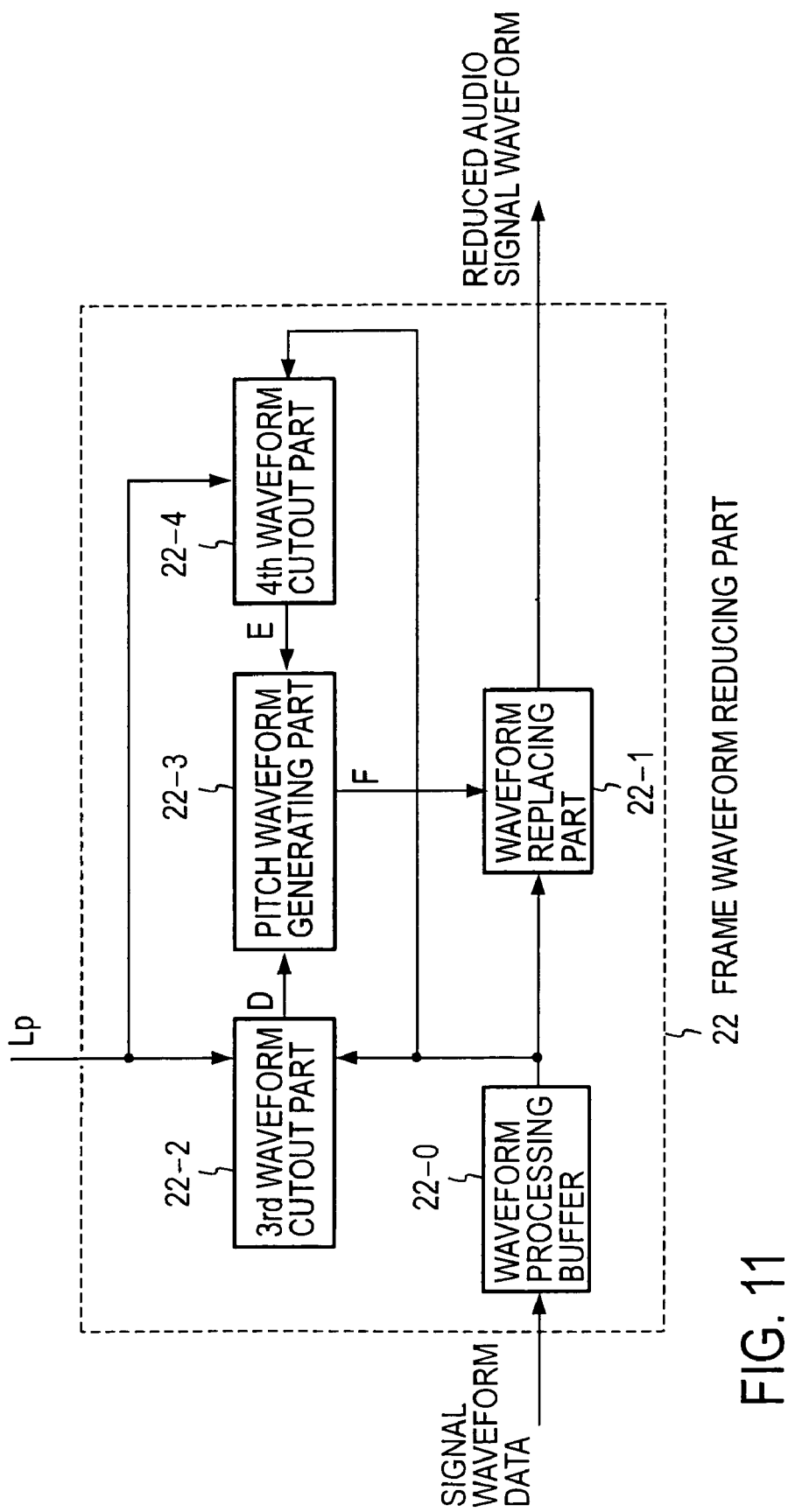
FIG. 11 is a block diagram showing an internal configuration of a waveform reducing part 22 shown in FIG. 3.
Figure 12A:
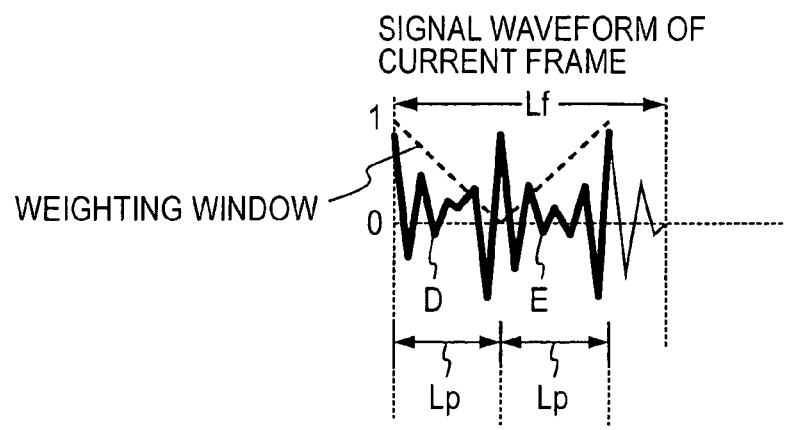
FIG. 12 is a timing chart illustrating operation of the frame waveform reducing part 22 shown in FIG. 11.
Figure 12C:
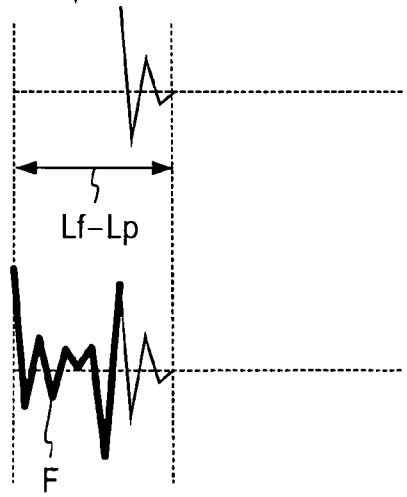

FIG. 11 shows an exemplary functional configuration of the frame waveform reducing part 22 shown in FIG. 3 and FIG. 12 shows an example of waveform reduction processing performed by the frame waveform reducing part 22. The frame waveform reducing part 22 includes a waveform processing buffer 22-0, a waveform replacing part 22-1, a third-waveform cutout part 22-2, a pitch waveform generating part 22-3, and a fourth-waveform cutout part 22-4.

The third-waveform cutout part 22-2 cuts out a waveform D of a segment over 1 pitch length Lp starting from the first sample of the audio signal waveform of the current frame held in the waveform processing buffer 22-0 as shown in row A of FIG. 12. The fourth-waveform cutout part 22-4 cuts out the waveform E over the 1-pitch-long Lp segment that follows the waveform D of the audio signal waveform of the current frame.

The pitch waveform generating part 22-3 assigns weights to the cut-out waveforms D and E by using triangular windows and adds the weighted waveforms together to generate a waveform F shown in row B of FIG. 12. The triangular windows used here are also described in Non-patent literature 1. For the waveform D, the triangular window may have a shape in which the weight linearly changes from 1 at the start of the waveform segment to 0 at the end of the segment; for the waveform E, it may have a shape in which the weight linearly changes from 0 at the start of the waveform segment to 1 at the end of the segment.

The waveform replacing part 22-1 reduces the 2-pitch-long segment of contiguous waveforms D and E shown in row A to a 1-pitch-long segment as shown in row C and replaces it with the 1-pitch-long waveform F (row D).

As a result of the processing by the frame waveform reducing part 22, the input audio signal having the frame length Lf is reduced to a signal having the length Lf−Lp and outputted.

If the pitch length Lp exceeds ½ of the frame length Lf, the frame waveform reducing part 22 cannot perform the reduction processing described above, because waveform E cannot be cut out from the frame. For example, if the frame length Lf is 20 msec, the pitch length Lp should be less than or equal to 10 msec, which means that the pitch frequency must be 100 Hz or more. Male voice may have pitch frequencies less than 100 Hz. When the pitch length Lp exceeds ½ of the frame length Lf as in the male voice, the size of the wave processing buffer 22-0 of the frame waveform reducing part 22 is chosen to be a value equivalent to 2 frames and the reduction processing as described above may be performed on the audio signal of two contiguous frames, namely the current frame and the preceding frame.

If the pitch length Lp is longer than the frame length Lf, neither reduction processing on the input audio signal in two frames nor processing by the frame waveform expanding part 21 can be performed. However, the pitch length rarely exceeds 20 msec, that is, the pitch frequency is rarely less than 50 Hz. Therefore, if the input pitch length Lp is longer than the frame length Lf, the input signal may be simply outputted without performing either of frame waveform expansion and reduction.

Returning to FIG. 3, the control part 16 determines, on the basis of the largest delay jitter J provided from the state detecting part 14 and the number of packets stored in the receiving buffer 12 (buffer level) S, whether the number of packets to be stored in the receiving buffer should be increased, decreased, or kept the same.

The control part 16 possibly determines that the number of packets to be stored should be increased in any of the following states:

(a) the number of audio packets stored in the receiving buffer is decreasing, (b) the number of audio packets stored in the receiving buffer becomes less than a predetermined value, and (c) the length of the packet arrival interval is increasing.

The control part 16 possibly determines that the number of packets to be stored should be decreased in any of the following states:

(a) the number of audio packets stored in the receiving buffer is increasing, (b) the number of the audio packets stored in the receiving buffer reaches a predetermined value, and (c) the length of the packet arrival interval is decreasing.

If the control part 16 determines that the number of packets currently stored is appropriate with respect to the largest delay jitter at the time of arrival of a packet, then the control part 16 determines that the number of packets should be kept the same. An example of optimum numbers of stored packets for actual delay jitters in milliseconds is shown in FIG. 4. It may be preferable that the total time length of frames calculated from the number of stored packets S, that is, S×Lf, be somewhat longer than the maximum value of the packet arrival intervals at the packet receiving part 11 in a given period of time (for example 2 seconds).

If the control part 16 determines that the number of stored packets should be increased, the control part 16 turns the switches SW1 and SW2 to the terminal A1 and A2, respectively. If the control part 16 determines that the number of stored packets should be decreased, the control part 16 turns the switches SW1 and SW2 to the terminal C1 and C2, respectively. If the control part 16 determines that the number of stored packets should be kept the same, the control part 16 turns the switch SW1 and SW2 to the terminals B1 and B2, respectively. The selected positions set the consumption value in the consumption adjusting part 20.

The waveform expansion buffer 23 stores an audio data stream appearing on the output side of switch SW2. The stored audio data stream is used in the frame waveform expanding part 21 as described above.

After the audio data stream is sent to the sound device 18, output sound is reproduced in synchronization with a clock having a predetermined rate. On the completion of reproduction of audio signal from the audio data stream with the time length it has received, the sound device 18 receives an audio data stream decoded from the next packet.

As mentioned above, sound devices 18 typically have sound device buffers and a technique called double buffering is often used. When both of the buffers are full, reproduction for data in one of the buffers ends and the next audio data stream is not received until the buffer becomes empty.

When switches SW1 and SW2 are set to terminals C1 and C2, respectively, that is, when they are set to the frame waveform reducing part 22, a signal shorter than the original frame length is outputted from switch SW2. If the signal shorter than the frame length is simply sent to the sound device 18, overhead in the sound device increases and audible discontinuities in voice can occur. If the specifications of the sound device 18 specify a minimum allowable frame length, preferably an intermediate buffer may be provided between switch SW2 and the sound device 18.

When switches SW1 and SW2 are turned to terminals A1 and A2, the decoded audio data stream outputted from the audio packet decoding part 13 is sent to the sound device 18 through the frame waveform expanding part 21. Because the decoded audio data stream having the length Lf is expanded by passing through the frame waveform expanding part 21 into a data stream having the length Lf+Lp, the reproduction time at the sound device 18 is increased to Lf+Lp. In other words, the sound device 18, which would otherwise receive audio data streams at time intervals of Lf, receives audio data streams at time intervals of Lf+Lp at the time of reproducing a signal having the length Lf+Lp.

The audio packet decoding part 13 does not send the next send request to the receiving buffer 12 unless the sound device 18 receives an audio data stream. Therefore, as long as the packet receiving part 11 is receiving packet at regular intervals, the number of packets stored in the receiving buffer 12 increases on average. "Increase on average" means that an increase in the amount of packets stored in the receiving buffer 12 by one frame waveform expanding operation is less than one frame because Lp<Lf, but the number of packets stored in the receiving buffer 12 is increased by M frames by expansion operations by the frame waveform expanding part 21 over a number (N) of frames of the decoded audio signal, where M is smaller than N.

Referring to FIG. 13, how the number of packets increases will be described. Row A of FIG. 13 shows packets $P_1, P_2, P_3, \ldots$ sequentially stored in the receiving buffer 12; row B of FIG. 13 shows normal consumption state of audio frames $F_1, F_2, F_3 \ldots$. While switches SW1 and SW2 are set to terminal B1 and B2, respectively, packets stored in the receiving buffer 12 are retrieved one by one, decoded in the audio packet decoding part 13 into an audio data stream segmented into frames with the frame length Lf, and provided to the sound device 18 through the through-path 24 without undergoing reduction or expansion. The sound device 18 reproduces a sound from the audio data stream frame by frame Lf. Therefore, in this state, 1 frame length of sound is reproduce each time 1 packet is consumed. After one packet of sound is reproduced, the next packet is retrieved from the receiving buffer 12 and decoded into an audio data stream in the audio packet decoding part 13.

On the other hand, in a low consumption state as shown in row C of FIG. 13, switches SW1 and SW2 are connected to terminals A1 and A2, respectively, and the decoded audio data stream undergoes expansion processing. Consequently, the time length of the audio data stream provided to the sound device 18 is Lf+Lp. Thus, expanded frames $F'_1, F'_2, F'_3$, expanded as shown in row C are provided to the sound device 18. The sound device 18 reproduces sound of each frame length Lf of audio data stream decoded from each packet over a period of Lf+Lp. Therefore, the sound device 18 requests the audio packet decoding part 13 to output the decoded audio data stream, at intervals of Lf+Lp. In the exemplary normal consumption state shown in row B of FIG. 13, 6 packets are consumed in the period of time TM. In contrast, in the exemplary consumption state shown in row C of FIG. 13 in which a packet is retrieved from the receiving buffer 12 at intervals of Lf+Lp, 4 packets are consumed. Thus, the packet consumption can be reduced compared with the normal consumption state.

When switches SW1 and SW2 are turned to terminals C1 and C2, the decoded audio data stream outputted from the audio packet decoding part 13 passes through the frame waveform reducing part 22 to the sound device 18. Because the decoded audio data stream with the length Lf after passing through the frame waveform reducing part 22 is reduced to an audio data stream with the length Lf−Lp, frames $F''_1, F''_2, F''_3, \ldots$, each reduced in length as shown in raw D of FIG. 13, are provided to the sound device 18. Consequently, the reproduction time of each reduced frame at the sound device 18 is also reduced to Lf−Lp. That is, while the sound device 18 would otherwise receive the audio data stream at time intervals Lf, it receives the audio data stream at intervals of Lf−Lp during reproduction of the signal with the length of Lf−Lp. As a result, the audio packet decoding part 13 also issues the next send request to the receiving buffer 12 at time intervals shorter than the normal frame length Lf. Therefore, as long as the packet receiving part 11 is receiving packets at regular intervals, the number of packets stored in the receiving buffer decreases on average. "Decrease on average" means that the amount of packets stored in the receiving buffer decreases by a fraction of a frame by one frame waveform reduction operation because Lp<Lf, but the number of packets stored in the receiving buffer decreases by M frames after a number (N) of frames passes through the frame waveform reducing part 22, where M is smaller than N.

In the example shown in row D of FIG. 13, 10 packets are consumed in the same amount of time TM by passing through the frame reducing part 22. By increasing packet consumption in this way, the number of packets stored in the receiving buffer 12 can be reduced.

The control part 16 can perform more sophisticated buffer level control. For example, when it is determined, on the basis of the buffer level S and the largest delay jitter J provided from the state detecting part 14, that the amount of packets to be stored in the receiving buffer should be increased or decreased, then whether it should be increased/decreased urgently or slowly, namely the rate at which the number of packets is increased or decreased, can also be determined. Specifically, if the conditions of the communication network have suddenly deteriorated, a gradual increase of the number of packets to be stored in the receiving buffer may not able to prevent audible discontinuities in sound. If the conditions of the communication network rapidly change, the number of packets to be stored in the buffer should also be controlled urgently. On the other hand, if the number of packets stored in the buffer gradually increases or decreases beyond a desired value due to accumulation of slight discrepancies in clock rate or timing between the sending and receiving end, i.e. accumulation of changes commonly called drift, then the number of packets stored in the receiving buffer may be adjusted slowly.

When the number of packets stored in the receiving buffer must be increased or decreased urgently, switches SW1 and SW2 of the consumption adjusting part 20 are set to terminals A1 and A2 or C1 and C2, respectively, to expand or reduce the waveform quickly regardless of whether the frame is in a voice segment or non-voice segment, thereby enabling increase or decrease of the number of packets stored to be controlled quickly. On the other hand, if gradually increasing or decreasing the number of packets stored is sufficient, then switches SW1 and SW2 may be set to terminals A1 and A2 or C1 and C2, respectively only in a non-voice frame, depending on the determination in the voice analysis part 15 as to whether the frame is in a voice segment or a non-voice segment. Furthermore, if the frame is in a non-voice frame, the pitch length can be set to any value less than or equal to ½ of the frame length Lf, rather than a value determined based on actual pitch analysis. Therefore, preferably, the pitch length may be set to a smaller value when an increase or decrease is to be caused more gradually.

Figure 14:
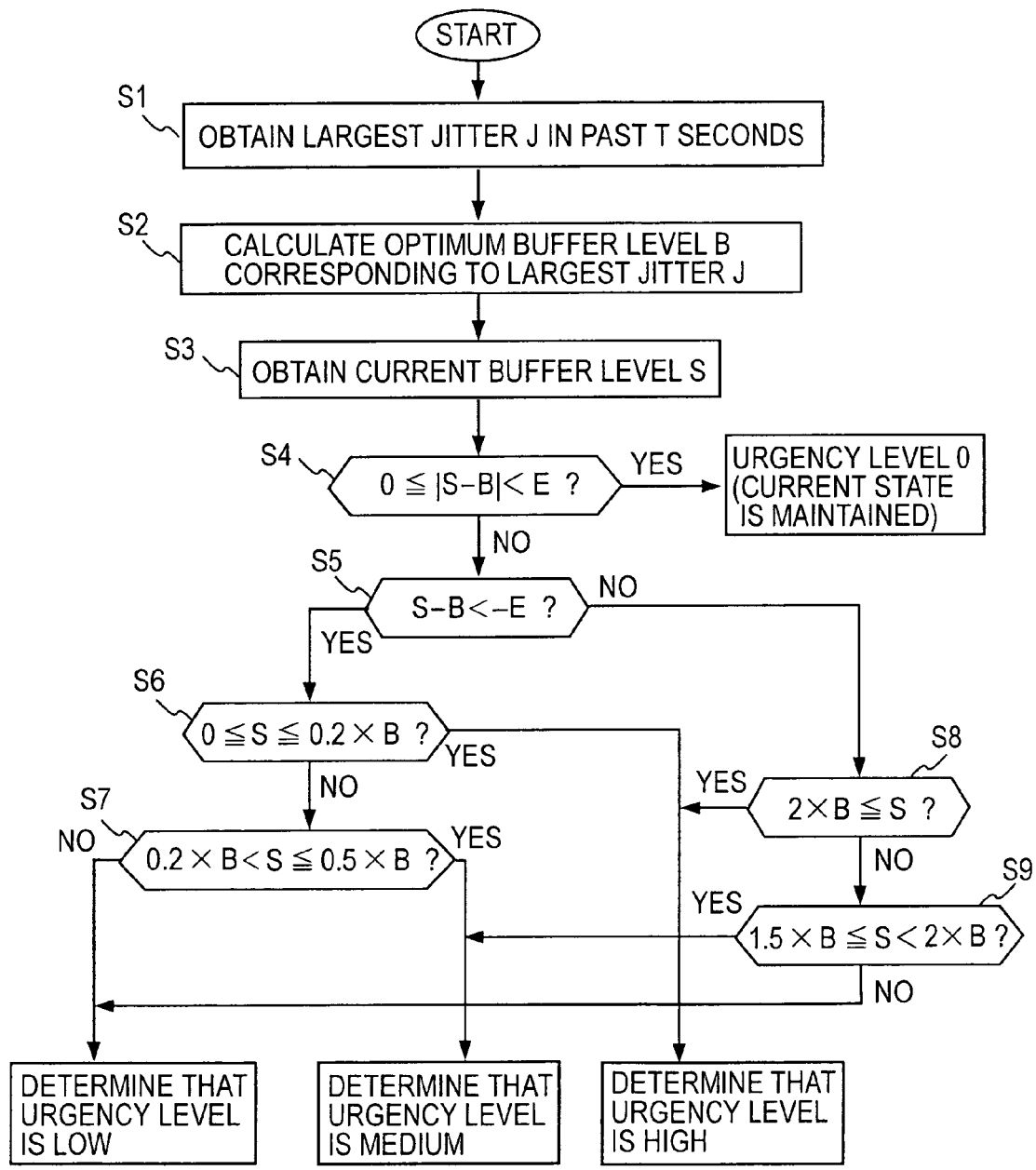
FIG. 14 is a flowchart showing a process for determining the level of urgency for buffer level adjustment.

FIG. 14 shows a process for determining the level of urgency about the need to adjust the buffer level, on the basis of the determination by the audio analyzing part 15 shown in FIG. 6 as to whether a frame is in a voice segment or a non-voice segment, the largest delay jitter J in the past T seconds (for example 2 seconds) with respect to the currently received packet detected by the state detecting part 14, and the number of packets S stored in the receiving buffer 12.

Step S1: The largest delay jitter J in the state detecting part 14 is obtained based on the arrival time of each packet in the receiving buffer 12.

Step S2: By the control part 16, the optimum buffer level B for the largest delay jitter J is obtained with reference to table 16T in FIG. 4.

Step S3: By the state detecting part 14, the current buffer level B of (the number of packet stored in) the receiving buffer 12 is obtained.

Step S4: Determination is made as to whether or not the absolute value of the difference |S−B| between the optimum buffer level B determined by the control part 16 and the actual buffer level S detected by the state detecting part 14 is less than a predetermined positive value E. If it is smaller than E, it is determined that the buffer level does not need to be adjusted, and the current buffer level is maintained (this is defined as urgency level 0).

Step S5: If the absolute value of the difference |S−B| is not less than E, it means that the buffer level must be adjusted, and determination is made as to whether the difference S−B is less than or equal to −E. If it is less than or equal to −E, it means that the buffer level must be increased. Therefore, steps S6 and S7 described below are performed to determine the level of urgency about the need to increase the buffer level. If the difference S−B is not less than or equal to −E, then the S−B is greater than or equal to E, which means that the buffer level must be decreased. Therefore steps S8 and S9 described below are performed to determine the level of urgency about the need to decrease the buffer level.

Step S6: Determination is made as to whether or not the current buffer level S is greater than or equal to 0 and less than or equal to 20% of the optimum buffer level B. If so, it is determined that the level of urgency about the need to adjust (here, increase) the buffer level is high. It should be noted that if B is greater than or equal to 1 and S is 0, that is, the buffer is exhausted and therefore audible discontinuities in sound can occur, it is also determined at this step that the urgency level is high.

Step S7: Determination is made as to whether or not the current buffer level S is greater than 20% of the optimum buffer level B and less than or equal to 50% of the optimum buffer level B. If so, it is determined that the urgency level for buffer level adjustment is medium; otherwise it is determined that the urgency level is low.

Step S8: If S−B<−E, then the buffer level must be increased, and determination is made as to whether the current buffer level S is greater than or equal to 200% of the optimum buffer level B. If so, it is determined that the urgency level is high.

Step S9: If S is not greater than or equal to 200% of B, then determination is made as to whether S is less than 200% of B and greater than or equal to 150% of B. If so, it is determined that the urgency level is medium; otherwise, it is determined that the urgency level is low.

First Example of Control

Table 1 in FIG. 15 shows a first example of control of the consumption adjusting part 20 performed by the control part 16 according to the urgency level (high, medium, low, or 0) determined by the process shown in FIG. 14 and the result of determination as to whether the frame is in a voice or non-voice segment.

Whenever it is determined that the urgency level is high, expansion/reduction processing is performed for the current frame of the decoded audio data stream regardless of the result of determination as to whether the audio signal is in a voice segment or a non-voice segment as follows: if the buffer level should be increased, switches SW1 and SW2 are turned to terminal A1 and A2, respectively; if the buffer level should be decreased, switches SW1 and SW2 are turned to terminals C1 and C2, respectively. When it is determined that the urgency level is medium, the same control as that in the high level.

If it is determined that the urgency level is low and the current frame of the decoded audio data stream is in a voice segment, then switches SW1 and SW2 are fixed at terminals B1 and B2, respectively, so that expansion/reduction is not performed. If it is determined that the urgency level is low and the current frame is in a non-voice segment, switches SW1 and SW2 are turned to terminals A1 and A2, respectively, in order to increase the buffer level, or switches SW1 and SW2 are turned to C1 and C2, respectively, in order to decrease the buffer level.

Second Example of Control

Table 2 in FIG. 16 shows a second example of control of the consumption adjusting part 20 performed by the control part 16 according to the urgency level (high, medium, low, or 0) determined by the process shown in FIG. 14 and the result of determination as to whether the frame is in a voice or non-voice segment. When compared with the first exemplary control, this exemplary control turns switches SW1 and SW2 to A1 and A2 or C1 and C2, respectively, every N1-th frame if the urgency level is low in a voice segment. For the other frames, switches SW1 and SW2 are set to B1 and B2, respectively. This control is made possible to change the buffer level even if a non-voice segment is not detected, because, depending on sound conditions (telephone conversation environment), no non-voice segment may be detected. The value of N1 is an integer greater than or equal to 1, for example N1=5. The second example of control is otherwise the same as the first example of control.

Third Example of Control

Table 3 in FIG. 17 shows a third example of control of the consumption adjusting part 20 performed by the control part 16. In the second example shown in FIG. 16, the identical control is performed for the medium and high urgency levels, whereas in the third example the control for the medium urgency level differs from that for the high urgency level. In a voice segment, switches SW1 and SW2 are set to A1 and A2 or C1 and C2, respectively, every N2-th frame in a voice segment. For other frames, they are set to B1 and B2, respectively. The value of N2 is an integer greater than or equal to 1. Preferably, N2 may be set to a value smaller than N1 (that is, this control will set the switches to A1 and A2 or C1 and C2 less frequently than the corresponding control in the second example), for example N2=2. The third example of control is otherwise the same as the second example of control.

Fourth Example of Control

Table 4 in FIG. 18 shows a fourth example of control of the consumption adjusting part 20 performed by the control part 16. In this example of control, a general scheme is defined in which switches SW1 and SW2 are set to A1 and A2 or C1 and C2, respectively, once every number of frames predetermined for each set of urgency level and voice/non-voice segment and are set to B1 and B2, respectively, for the other frames. That is, the controls for the low and high urgency levels in a voice segment are the same as those in the third example in FIG. 17. However, when the urgency level is high, switches SW1 and SW2 are set to A1 and A2 or C1 and C2, respectively, every N3-th frame regardless of whether the frame is in a voice segment or non-voice segment. When the urgency level is medium, switches SW1 and SW2 are set to A1 and A2 or C1 or C2, respectively, every N4-th fame in a non-voice segment and are set to B1 and B2 for the other frames. When the urgency level is low, switches SW1 and SW2 are set to A1 and A2 or C1 and C2, respectively, every N5-th frame in a non-voice segment and are set to B1 and B2 for the other frames.

The value of N3 is an integer greater than or equal to 1, for example N3=1. The value of N4 is an integer greater than or equal to 1, for example N4=1. N5 is an integer greater than or equal to 1, for example N5=2. By choosing proper values for N1 to N5, the balance between degradation of sound quality (increase in perceived annoying artifacts) and the rate of buffer level change can be adjusted.

Second Embodiment

Figure 19:
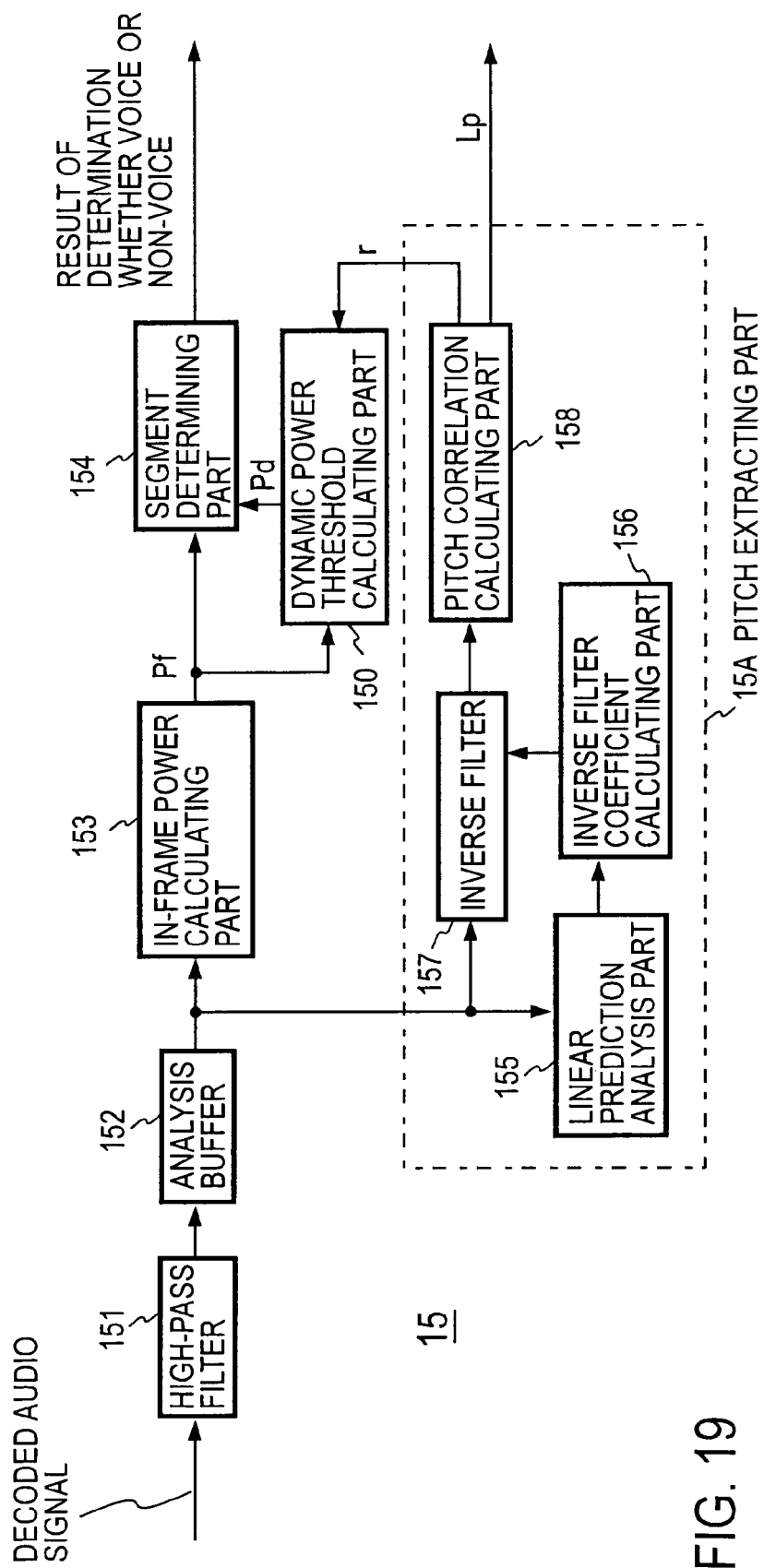
FIG. 19 is a block diagram showing a second embodiment of the audio analyzing part 15 shown in FIG. 3.

In the audio analyzing part 15 shown in FIG. 6, the frame power Pf is compared against the fixed threshold Pth to determine whether a decoded audio signal in the current frame is in a voice segment or a non-voice segment. This configuration is advantageously simple. However, if a decoded audio signal contains high-level background noise (such as the hum of an air conditioner, babble in an office, or street noise), it may be difficult to precisely determine whether a frame is in a voice segment or a non-voice segment. FIG. 19 shows a configuration which alleviates the problem by taking into consideration background noise in voice segment/non-voice segment determination.

In the configuration of the audio analyzing part 15 shown in FIG. 19, a dynamic power threshold calculating part 150 is provided in addition to the components shown in FIG. 6, and a pitch correlation calculating part 158 performs pitch analysis to obtain the pitch length Lp and also obtain a pitch correlation value (correlation peak value) r. The dynamic power threshold calculating part 150 dynamically determines a power threshold Pd by using a series of powers Pf of the individual frames over the previous period of predetermined time (for example several to several tens of seconds) and pitch correlation values r obtained for the individual frames. For example, frames having high pitch correlations r, for example $r \geq 0.7$, are considered to almost certainly belong to a voice segment and long-time average Pav1 of powers of these frames is calculated to estimate the audio signal level.

On the other hand, frames having low pitch correlations r, for example $r \leq 0.4$, are estimated to belong to a non-voice segment (that is, a background noise segment) or an unvoiced sound segment (non voiced sound segment) in a voice segment. It is difficult to precisely determine whether a frame is in a background noise segment or an unvoiced sound segment. However, given that unvoiced sound segments occur less frequently, the signal level of a non-voice segment can be estimated by calculating the long-time average Pav2 of the powers of frames that are considered to be in a background noise segment or an unvoiced sound segment. Of course, it is desirable that a background noise segment be distinguished from an unvoiced sound segment so that the long-time average of power can be calculated from background noise frames only. Therefore, the steadiness of frame powers of frames with low pitch correlation values r over time may be observed and unsteady segments may be considered to be unvoiced sound segments and excluded from the calculation of the long-time power average.

The dynamic power threshold calculating part 150 dynamically determines and updates the dynamic power threshold Pd in accordance with the estimated audio signal level Pav1 and the signal level Pav2 in a non-voice segment (that is, a background noise segment). For example, the dynamic power threshold Pd is chosen to be a value between levels Pav1 and Pav2. Preferably, Pd is chosen to be a value slightly greater than the level value Pav2 of the signal in a non-voice segment. A segment determining part 154 determines that a frame is in a voice segment if the power Pf of the frame is greater than the dynamic power threshold Pd. Otherwise, it determines that the frame is in a non-voice segment.

The result of determination in the second embodiment can be applied to any of the first to fourth examples of control described above and illustrated in FIG. 15 to 18.

Third Embodiment

While determination is made whether each frame is in a voice segment or non-voice segment in the first and second embodiments, further determination is made in this embodiment as to whether a voice segment is a voiced sound segment or an unvoiced sound segment and whether a non-voice segment is a background noise segment or a silence segment. Thus, each frame is identified as any of the four types of segments, namely, voiced sound, unvoiced sound, background noise, and silence segments, and a consumption adjusting part 20 is controlled on the basis of the identification. A configuration of an audio analyzing part 15 used for this is shown in FIG. 20.

Figure 20:
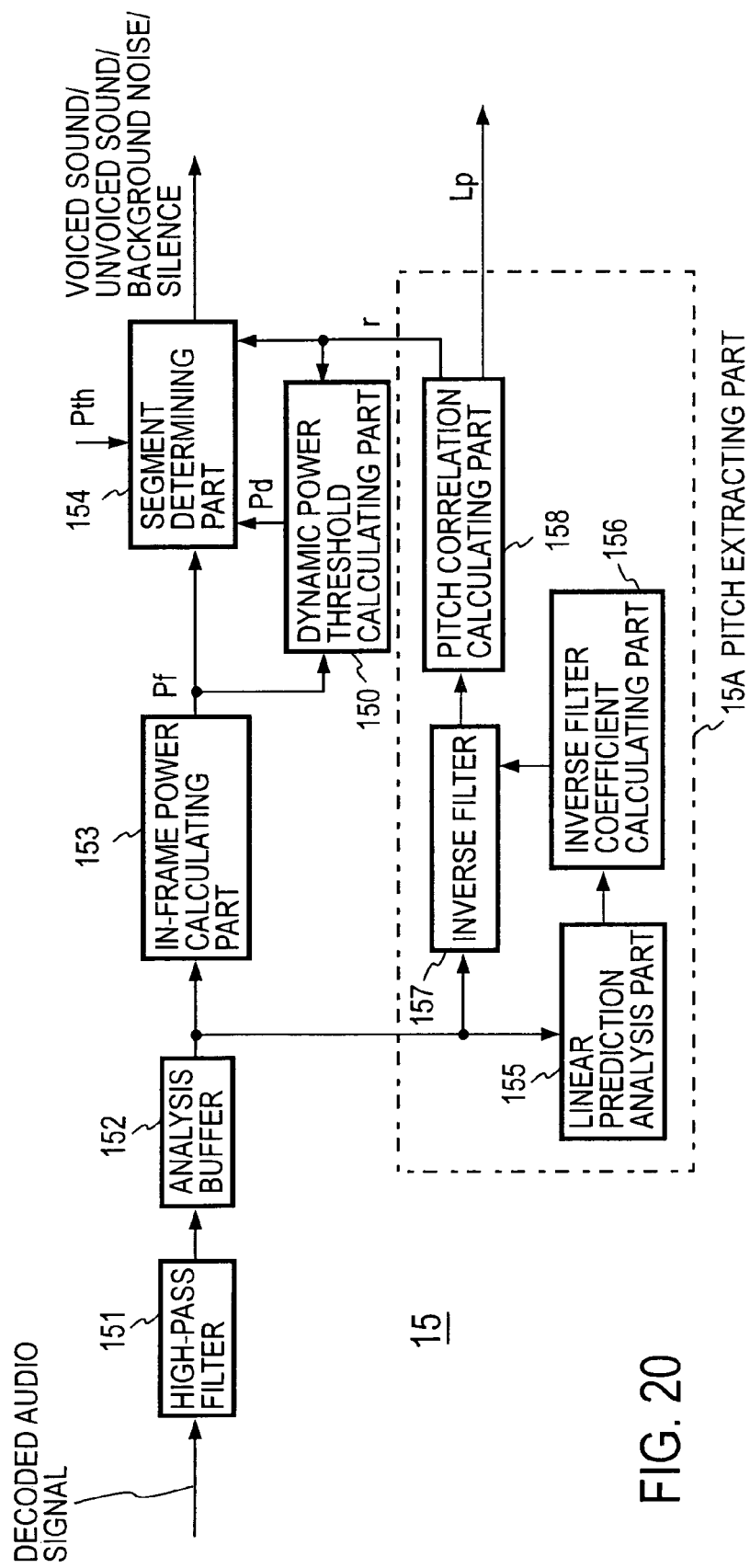
FIG. 20 is a block diagram showing a third embodiment of the audio analyzing part 15 shown in FIG. 3.

In the configuration of the audio analyzing part 15 shown in FIG. 20, a pitch correlation value r is provided also to a segment determining part 154 in the configuration shown in FIG. 19, both a dynamic power threshold Pd and a fixed power threshold Pth are used as the power thresholds in the segment determining part 154, and determination is made from the frame power Pf and pitch correlation value r as to which of the four types of segments the frame is in.

Figures 21, 22:
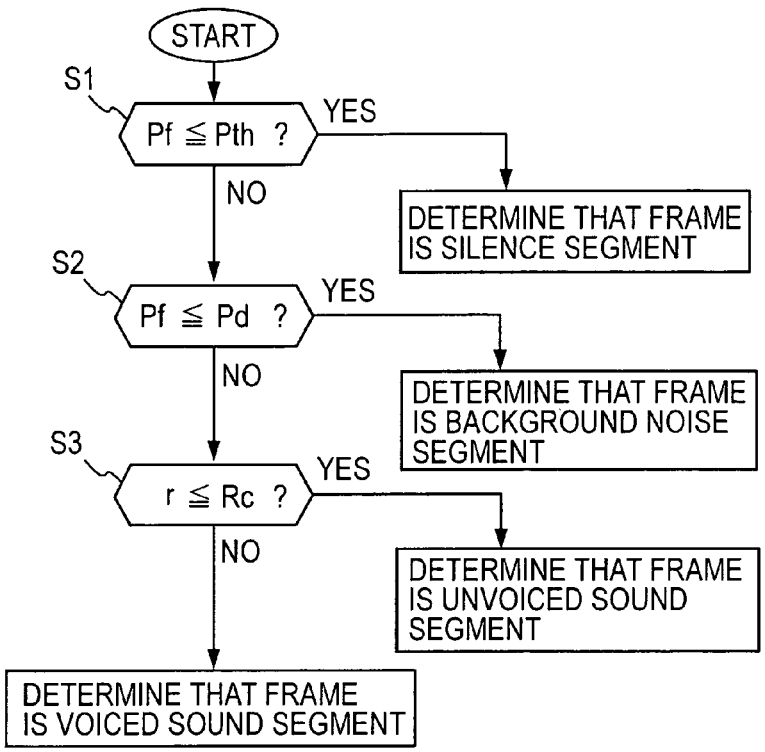
FIG. 21 is a flowchart showing a process for determining the type of an audio frame segment in FIG. 20.
FIG. 22 is Table 5 showing an example of control by the consumption adjusting part 20 for the type of audio frame determined in FIG. 21.

FIG. 21 shows a process for the segment determination.

Step S1: Determination is made as to whether the power Pf of a frame is less than or equal to the fixed threshold Pth. If so, it is determined that the frame is in a silence segment.

Step S2: If Pf is not less than or equal to Pth, determination is made as to whether the frame power Pf is less than or equal to the dynamic power threshold Pd. If so, it is determined that the frame is in a background noise segment.

Step S3: If Pf is not less than or equal to Pd, determination is made as to whether the pitch correlation value r is less than or equal to a predetermined positive value Rc. If so, it is determined that the frame is in an unvoiced sound segment in a voice segment; otherwise, it is determined that the frame is in a voiced sound segment in a voice segment.

Table 5 shown in FIG. 22 shows an example of control of a consumption adjusting part 20 performed by a control part 16 in accordance with the urgency level (high, medium, low, or 0) determined by the process illustrated in FIG. 14 and the result of segment determination by the process in FIG. 21. In the example of control, whenever it is determined that the urgency level is high, switches SW1 and SW2 of the consumption adjusting part 20 are set to terminals A1 and A2 or C1 and C2, respectively, regardless of the result of segment determination.

If it is determined that the urgency level is medium, switches SW1 and SW2 are set to terminals A1 and A2 or C1 and C2, respectively, every predetermined number N6, N7, N8, N9 of frames, where the predetermined integer number is an integer determined for each of the types of segments, voiced sound, unvoiced sound, background, and silence, which may be, but not limited to, N6=2, N7=2, N8=1, and N9=1, for example.

Similarly, if it is determined that the urgency level is low, switches SW1 and SW2 are set to terminals A1 and A2 or C1 and C2, respectively, every predetermined number N10, N11, N12, N13 of frames. The predetermined number is an integer determined for each of the types of segments, voiced sound, unvoiced sound, background, and silence, which may be, but not limited to, N10=5, N11=4, N12=4, and N13=2, for example.

By choosing proper integer values for N6 to N13, the balance between degradation of sound quality (increase in perceived annoying artifacts) and the rate of buffer level change can be adjusted.

While the embodiments have been described in which the sound device 18 is connected to the last stage, the received audio data stream may be only stored and reproduction of sound is not necessarily required.

The reproducing method for audio packets according to the present invention described above can be implemented by causing a computer to execute a reproducing program according to the present invention. The reproducing apparatus for audio packets can be implemented by installing the reproducing program according to the present invention in a computer and causing its CPU to implement and execute the program. The reproducing program for audio packets according to the present invention is written in a computer-interpretable program language, and is either recorded on a computer-readable recording medium such as a magnetic disk or a CD-ROM, from which it is installed into the computer, or is installed into the computer over a communication network. The program is then interpreted by a CPU provided in the computer to perform reproduction for audio packets.

INDUSTRIAL APPLICABILITY

Applications in which audio communication is performed over IP communication networks are becoming widespread. The present invention can be applied to such applications to provide low-cost and highly reliable audio communications.

What is claimed is:

1. A reproducing method for receiving a stream of sent audio packets containing an audio code generated by encoding an input audio data stream frame by frame and reproducing an audio signal, comprising:
    (a) storing received packets in a receiving buffer;
    (b) detecting, in a control part, a largest delay jitter and a number of buffered packets, the largest jitter being any of a largest value or statistical value of jitter obtained by observing arrival jitter of the received packets over a predetermined period of time and the number of buffered packets being a number of packets stored in the receiving buffer;
    (c) obtaining, in a control part and based on the largest delay jitter, an optimum number of buffered packets by using a predetermined relation between the largest delay jitter and the optimum number of buffered packets, the optimum number of buffered packets being an optimum number of packets to be stored in the receiving buffer;
    (d) determining, in the control part, on a scale of a plurality of levels, a difference between the detected number of buffered packets and the optimum number of buffered packets;
    (e) retrieving, by the control part, a packet corresponding to a current frame from the receiving buffer and decoding an audio code in the packet to obtain a decoded audio data stream in the current frame; and
    (f) performing, in a consumption adjusting part, any of expansion, reduction, and preservation of a waveform of the decoded audio data stream in accordance with a rule to make the number of buffered packets close to the optimum number of buffered packets, the rule being established for each level of the difference, and outputting a result as audio data of the current frame,
    wherein step (f) includes obtaining a pitch length of the decoded audio data stream, analyzing the audio data stream to determine whether the audio data stream is in a voice segment or a non-voice segment, and performing any of expansion, reduction, and preservation by inserting or removing a waveform corresponding to the pitch length in the decoded audio string or by not changing the decoded audio signal string, on the basis of a result of the determination of voice/non-voice segment and a result of the determination of the difference.

2. The reproducing method according to claim 1, wherein,
    step (d) comprises determining whether a level of the difference represents a high urgency level indicating that the number of buffered packets should be urgently increased or decreased or a low urgency level indicating that the number of buffered packets should be slowly increased or decreased; and
    step (f) further comprises, if the level represents the high urgency level, expanding or reducing the waveform of the decoded audio data stream regardless of whether the data stream is in a voice segment or a non-voice segment; if the level represents the low urgency level, expanding or reducing the waveform of the decoded audio data stream, on condition that the decoded audio data stream is in a non-voice segment.

3. The reproducing method according to claim 1, wherein,
    step (d) comprises determining whether a level of the difference represents a high urgency level indicating that the number of buffered packets should be urgently increased or decreased or a low urgency level indicating that the number of buffered packets should be slowly increased or decreased; and
    step (f) further comprises, if the level represents the high urgency level, expanding or reducing the waveform of the decoded audio data stream regardless of whether the decoded audio data stream is in a voice segment or a non-voice segment, if the level represents the low urgency level, expanding or reducing the waveform of the decoded audio data stream once every predetermined number N1 of frames when the decoded audio data stream is in a voice segment, or expanding or reducing the waveform of the decoded audio data stream once every predetermined number N2 of frames when the decoded audio data stream is in a non-voice period, where N1 and N2 being integers greater than or equal to 1 and N2 is smaller than N1.

4. A reproducing method for receiving a stream of sent audio packets containing an audio code generated by encoding an input audio data stream frame by frame and reproducing an audio signal, comprising:
    (a) storing received packets in a receiving buffer;
    (b) detecting, in a control part, a largest delay jitter and a number of buffered packets, the largest jitter being any of a largest value or statistical value of jitter obtained by observing arrival jitter of the received packets over a predetermined period of time and the number of buffered packets being a number of packets stored in the receiving buffer;
    (c) obtaining, in a control part and based on the largest delay jitter, an optimum number of buffered packets by using a predetermined relation between the largest delay jitter and the optimum number of buffered packets, the optimum number of buffered packets being an optimum number of packets to be stored in the receiving buffer;

(d) determining, in the control part, on a scale of a plurality of levels, a difference between the detected number of buffered packets and the optimum number of buffered packets;

(e) retrieving, by the control part, a packet corresponding to a current frame from the receiving buffer and decoding an audio code in the packet to obtain a decoded audio data stream in the current frame; and (f) performing, in a consumption adjusting part, any of expansion, reduction, and preservation of a waveform of the decoded audio data stream in accordance with a rule to make the number of buffered packets close to the optimum number of buffered packets, the rule being established for each level of the difference, and outputting a result as audio data of the current frame, wherein step (f) includes obtaining the pitch length of the decoded audio data stream, analyzing the decoded audio data stream to determine which of a voiced sound segment, an unvoiced sound segment, a background noise segment, and a silence segment the decoded audio data stream is in, and performing any of expansion, reduction, and preservation of the decoded audio data stream by inserting or removing a waveform corresponding to the pitch length in the decoded audio data stream or by not changing the decoded audio data stream, on the basis of the result of the segment determination and the result of the determination of the difference level.

5. The reproducing method according to claim 4, wherein, step (d) comprises determining whether a level of the difference represents a high urgency level indicating that the number of buffered packets should be urgently increased or decreased or a low urgency level indicating that the number of buffered packets should be slowly increased or decreased; and step (f) further comprises, if the level represents the high urgency level, expanding or reducing the waveform of the decoded audio data stream regardless of a result of the segment determination; if the level represents a low urgency level, expanding or reducing the waveform of the decoded audio data stream once every predetermined number N1, N2, N3, N4 of frames, the predetermined number being predetermined for each of a voiced sound segment, an unvoiced sound segment, a background noise segment, and a silence segment, where N1, N2, N3, and N4 are positive integers and at least one of the integers is greater than or equal to 2 and differs from the other three integers.

6. A reproducing apparatus for audio packets which receives a stream of sent audio packets containing an audio code generated by encoding an input audio data stream frame by frame and reproduces an audio signal, comprising:

a packet receiving part configured to receive audio packets from a packet communication network;

a receiving buffer configured to temporarily store the received packets and configured to read out packets in response to a request;

a state detecting part configured to detect a largest delay jitter and a number of buffered packets, the largest jitter being any of a largest value or statistical value of jitter obtained by observing arrival jitter of the received packets over a predetermined period of time and the number of buffered packets being a number of packets stored in the receiving buffer;

a control part configured to
obtain based on the largest delay jitter an optimum number of buffered packets by using a predetermined relation between the largest delay jitter and the optimum number of buffered packets, the optimum number of buffered packets being an optimum number of packets to be stored in the receiving buffer, determine, on a scale of a plurality of levels, a difference between the detected number of buffered packets and the optimum number of buffered packets, and generate a control signal to perform any of expansion, reduction, and preservation of a waveform of the decoded audio data stream in accordance with a rule to make the number of buffered packets close to the optimum number of buffered packets, the rule being established for each level of the difference;

an audio packet decoding part configured to decode an audio code in a packet corresponding to a current frame extracted from the receiving buffer to obtain a decoded audio data stream in the current frame;

a consumption adjusting part configured to perform any of expansion, reduction, and preservation of the waveform of the decoded audio data stream in accordance with the control signal and configured to output a result as sound data of the current frame; and an audio analyzing part configured to analyze the decoded audio data stream to determine whether the decoded audio data stream is in a voice segment or a non-voice segment, the audio analyzing part providing a result of the determination to the control part, the audio control part obtaining a pitch length of the decoded audio data stream and providing the pitch length to the consumption adjusting part, wherein, the control part provides control to cause the consumption adjusting part to perform any of expansion, reduction, and preservation of the decoded audio data stream of the current frame, on the basis of a result of the segment determination and a result of the difference level determination, and the consumption adjusting part inserts or removes a waveform corresponding to the pitch length in the decoded audio data stream or does not change the decoded audio data stream, in accordance with the control.

7. The reproducing apparatus according to claim 6, wherein the control part determines whether a level of the difference represents a high urgency level indicating that the number of buffered packets should be urgently increased or decreased or a low urgency level indicating that the number of buffered packets should be slowly increased or decreased; and, if the level represents the high urgency level provides control to cause the consumption adjusting part to expand or reduce the waveform of the decoded audio data stream regardless of whether the data stream is in a voice segment or a non-voice segment; if the level represents the low urgency level, provides control to cause the consumption adjusting part to expand or reduce the waveform of the decoded audio data stream, when the decoded audio data stream is in a non-voice segment.

8. The reproducing apparatus according to claim 6, wherein the control part determines whether a level of the difference represents a high urgency level indicating that the number of buffered packets should be urgently increased or decreased or a low urgency level indicating that the number of buffered packets should be slowly increased or decreased; and, if the level represents the high urgency level, provides a control to cause the consumption adjusting part to expand or reduce the waveform of the decoded audio data stream regardless of whether the decoded audio data stream is in a voice segment or a non-voice segment; if the level represents the low urgency level, provides a control to cause the consumption adjusting part to expand or reduce the waveform of the decoded audio data stream once every predetermined number N1 of frames on the condition that the decoded audio data stream is in a voice segment, or to expand or reduce the waveform of the decoded audio data stream once every predetermined number N2 of frames when the decoded audio data stream is in a non-voice period, where N1 and N2 being integers greater than or equal to 1 and N2 is smaller than N1.

9. A reproducing apparatus for audio packets which receives a stream of sent audio packets containing an audio code generated by encoding an input audio data stream frame by frame and reproduces an audio signal, comprising:
   a packet receiving part configured to receive audio packets from a packet communication network;
   a receiving buffer configured to temporarily store the received packets and reading out packets in response to a request;
   a state detecting part configured to detect a largest delay jitter and a number of buffered packets, the largest jitter being any of a largest value or statistical value of jitter obtained by observing arrival jitter of the received packets over a predetermined period of time and the number of buffered packets being a number of packets stored in the receiving buffer;
   a control part configured to
      obtain based on the largest delay jitter an optimum number of buffered packets by using a predetermined relation between the largest delay jitter and the optimum number of buffered packets, the optimum number of buffered packets being the optimum number of packets to be stored in the receiving buffer,
      determine, on a scale of a plurality of levels, a difference between the detected number of buffered packets and the optimum number of buffered packets, and
      generate a control signal for instructing to perform any of expansion, reduction, and preservation of a waveform of the decoded audio data stream in accordance with a rule to make the number of buffered packets close to the optimum number of buffered packets, the rule being established for each level of the difference;
   an audio packet decoding part configured to decode an audio code in a packet corresponding to a current frame extracted from the receiving buffer to obtain a decoded audio data stream in the current frame; and
   a consumption adjusting configured to perform any of expansion, reduction, and preservation of the waveform of the decoded audio data stream in accordance with the control signal and outputs a result as sound data of the current frame,
   wherein the audio analyzing part analyzes the decoded audio data stream to determine whether the decoded audio data stream includes a voiced sound segment, an unvoiced sound segment, a background noise segment, and a silence segment, provides a result of the determination to the control part, obtains a pitch length of the decoded audio data stream, and provides the pitch length to the consumption adjusting part;
   the control part provides a control based on a result of the segment determination and a result of the difference level determination to the consumption adjusting part to perform any of expansion, reduction, and preservation of the decoded audio data stream of a current frame; and
   the consumption adjusting part, in accordance with the control, inserts or removes a waveform corresponding to the pitch length in the decoded audio data stream or does not change the decoded audio data stream.

10. The reproducing apparatus according to claim 9, wherein the control part determines whether a level of the difference represents a high urgency level indicating that the number of buffered packets should be urgently increased or decreased or a low urgency level indicating that the number of buffered packets should be slowly increased or decreased; and, if the level represents the high urgency level, provides a control to cause the consumption adjusting part to expand or reduce the waveform of the decoded audio data stream regardless of the result of the segment determination; if the level represents a low urgency level, provides a control to cause the consumption adjusting part to expand or reduce the waveform of the decoded audio data stream once every predetermined number N1, N2, N3, N4 of frames, the predetermined number being predetermined for each of the voiced sound segment, the unvoiced sound segment, the background noise segment, and the silence segment, where N1, N2, N3, and N4 are positive integers and at least one of the integers is greater than or equal to 2 and differs from the other three integers.

11. A computer-readable recording medium storing computer-readable instructions thereon, the computer-readable instructions when executed by a computer cause the computer to perform the method comprising:
   storing received packets in a receiving buffer;
   detecting a largest delay jitter and a number of buffered packets, the largest jitter being any of a largest value or statistical value of jitter obtained by observing arrival jitter of the received packets over a predetermined period of time and the number of buffered packets being a number of packets stored in the receiving buffer;
   obtaining, based on the largest delay jitter, an optimum number of buffered packets by using a predetermined relation between the largest delay jitter and the optimum number of buffered packets, the optimum number of buffered packets being an optimum number of packets to be stored in the receiving buffer;
   determining, on a scale of a plurality of levels, a difference between the detected number of buffered packets and the optimum number of buffered packets;
   retrieving a packet corresponding to a current frame from the receiving buffer and decoding an audio code in the packet to obtain a decoded audio data stream in the current frame; and
   performing any of expansion, reduction, and preservation of a waveform of the decoded audio data stream in accordance with a rule to make the number of buffered packets close to the optimum number of buffered packets, the rule being established for each level of the difference, and outputting a result as audio data of the current frame,
   wherein the performing includes obtaining a pitch length of the decoded audio data stream, analyzing the audio data stream to determine whether the audio data stream is in a voice segment or a non-voice segment, and performing any of expansion, reduction, and preservation by inserting or removing a waveform corresponding to the pitch length in the decoded audio string or by not changing the decoded audio signal string, on the basis of a result of the determination of voice/non-voice segment and a result of the determination of the difference level.

12. A computer-readable medium storing computer-readable instructions thereon, the computer readable instructions when executed by a computer cause the computer to perform the method comprising:
   storing received packets in a receiving buffer;
   detecting a largest delay jitter and a number of buffered packets, the largest jitter being any of a largest value or statistical value of jitter obtained by observing arrival jitter of the received packets over a predetermined period of time and the number of buffered packets being a number of packets stored in the receiving buffer;

obtaining, based on the largest delay jitter, an optimum number of buffered packets by using a predetermined relation between the largest delay jitter and the optimum number of buffered packets, the optimum number of buffered packets being an optimum number of packets to be stored in the receiving buffer;

determining, on a scale of a plurality of levels, a difference between the detected number of buffered packets and the optimum number of buffered packets;

retrieving a packet corresponding to a current frame from the receiving buffer and decoding an audio code in the packet to obtain a decoded audio data stream in the current frame; and performing any of expansion, reduction, and preservation of a waveform of the decoded audio data stream in accordance with a rule to make the number of buffered packets close to the optimum number of buffered packets, the rule being established for each level of the difference, and outputting a result as audio data of the current frame, wherein the performing includes obtaining the pitch length of the decoded audio data stream, analyzing the decoded audio data stream to determine which of a voiced sound segment, an unvoiced sound segment, a background noise segment, and a silence segment the decoded audio data stream is in, and performing any of expansion, reduction, and preservation of the decoded audio data stream by inserting or removing a waveform corresponding to the pitch length in the decoded audio data stream or by not changing the decoded audio data stream, on the basis of a result of the segment determination and a result of the determination of the difference level.

* * * * *